Fig. 5

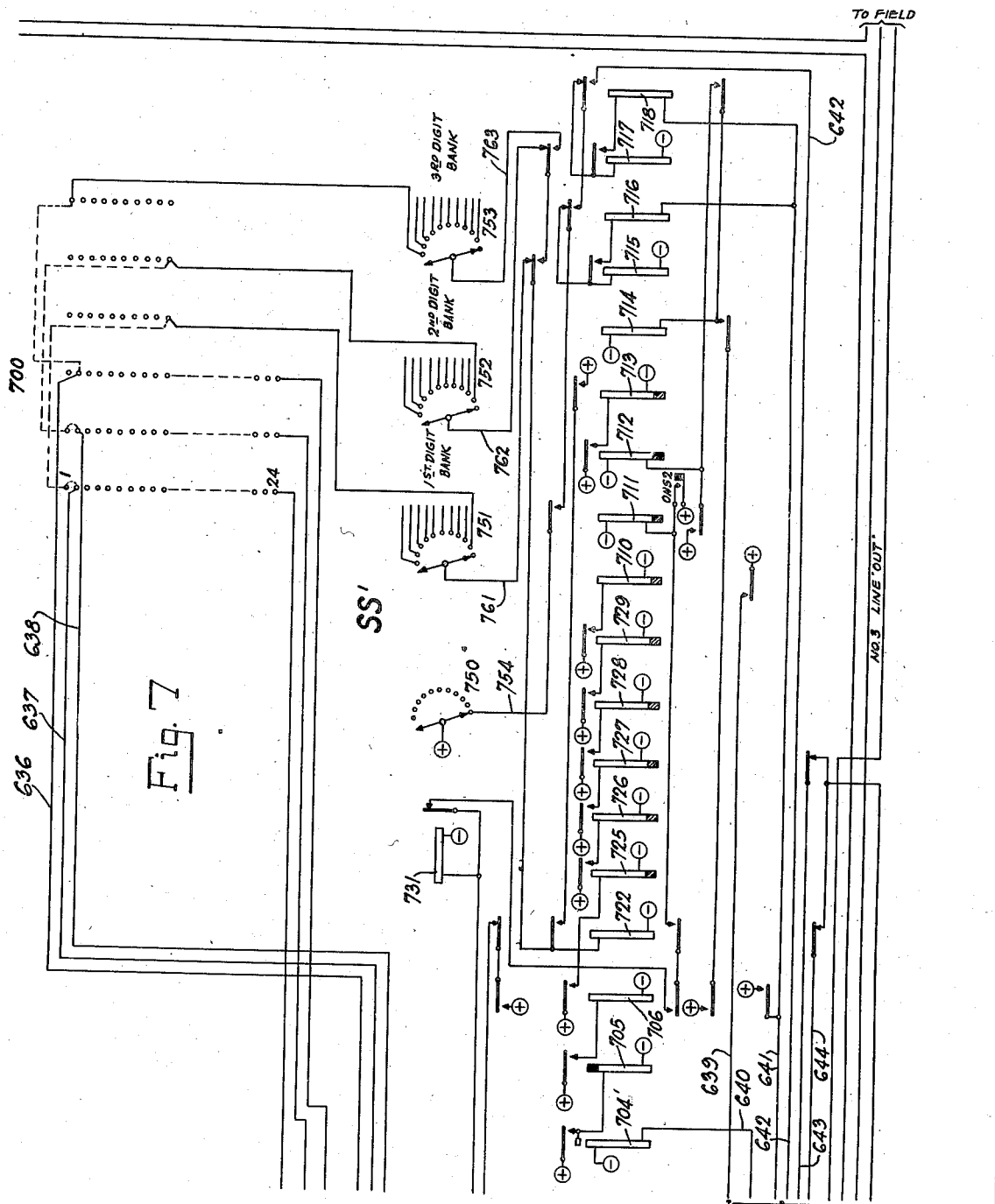

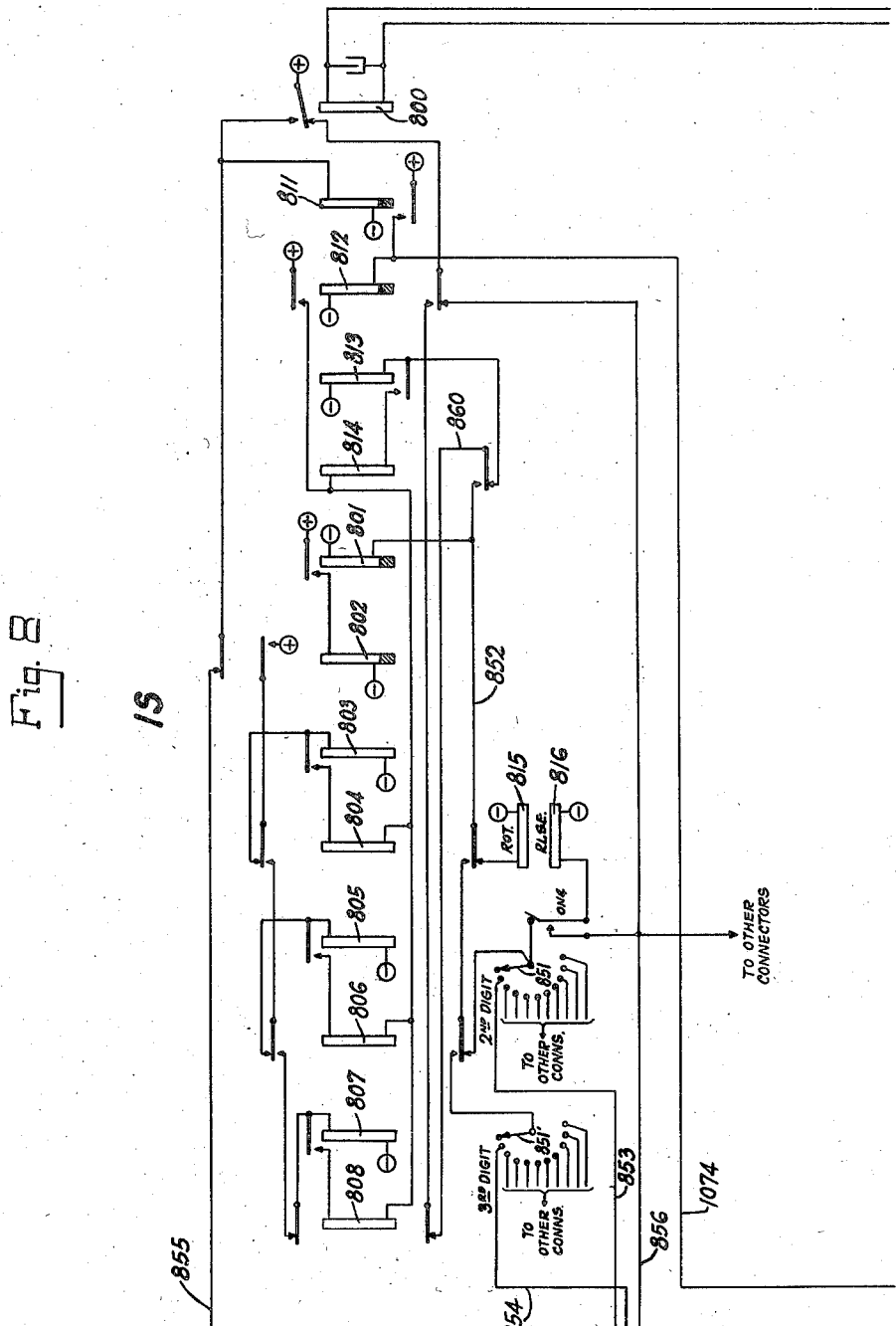

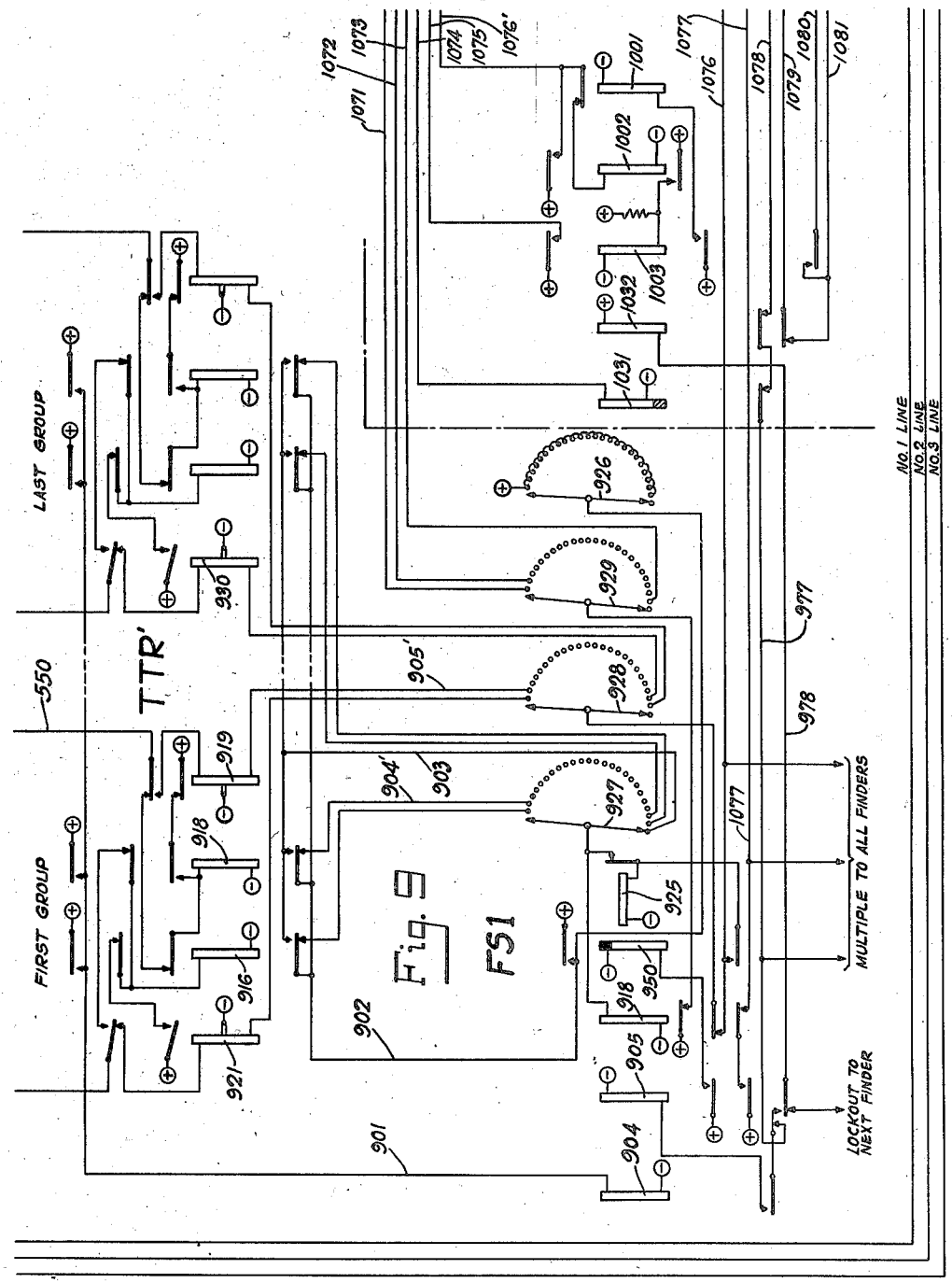

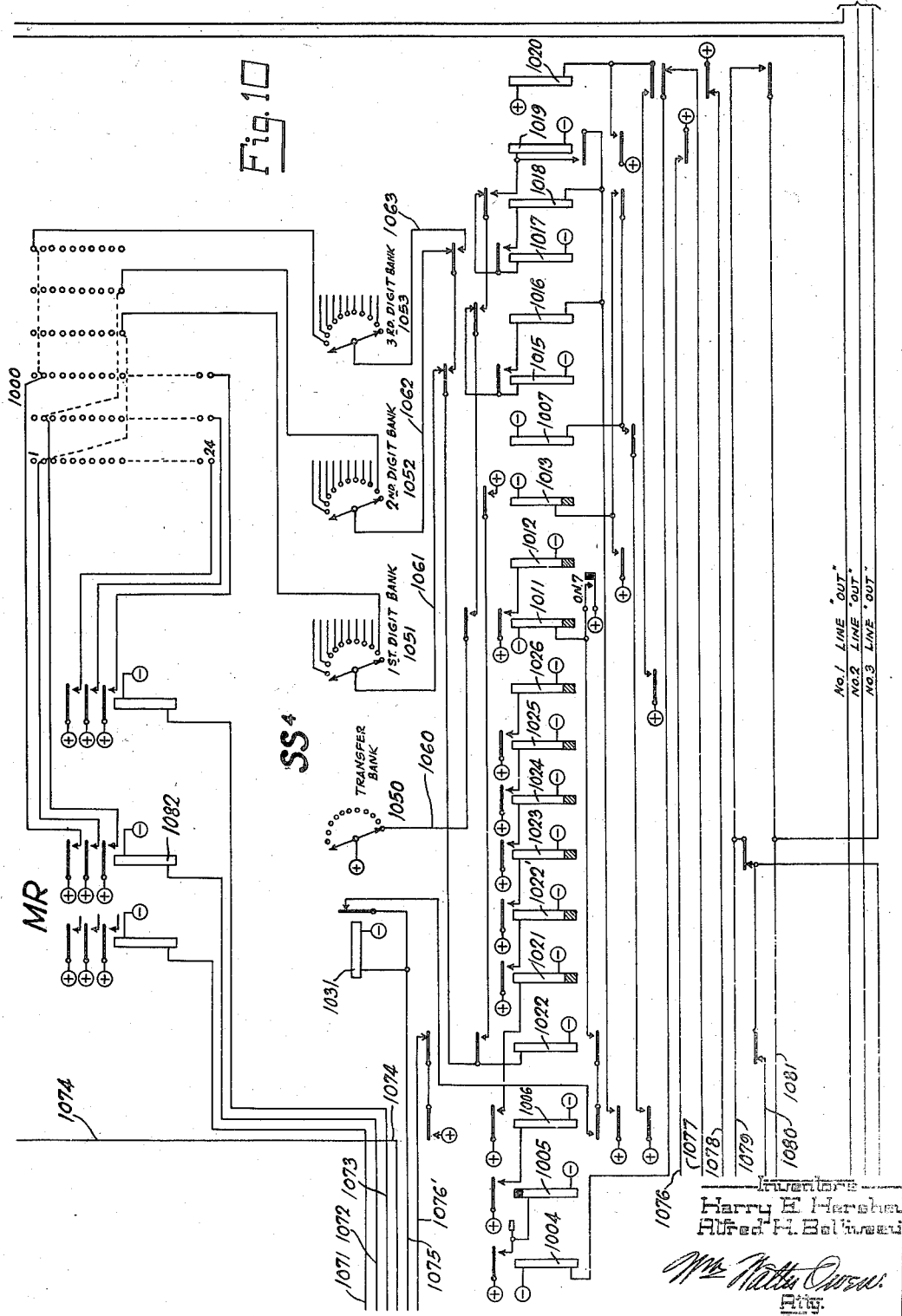

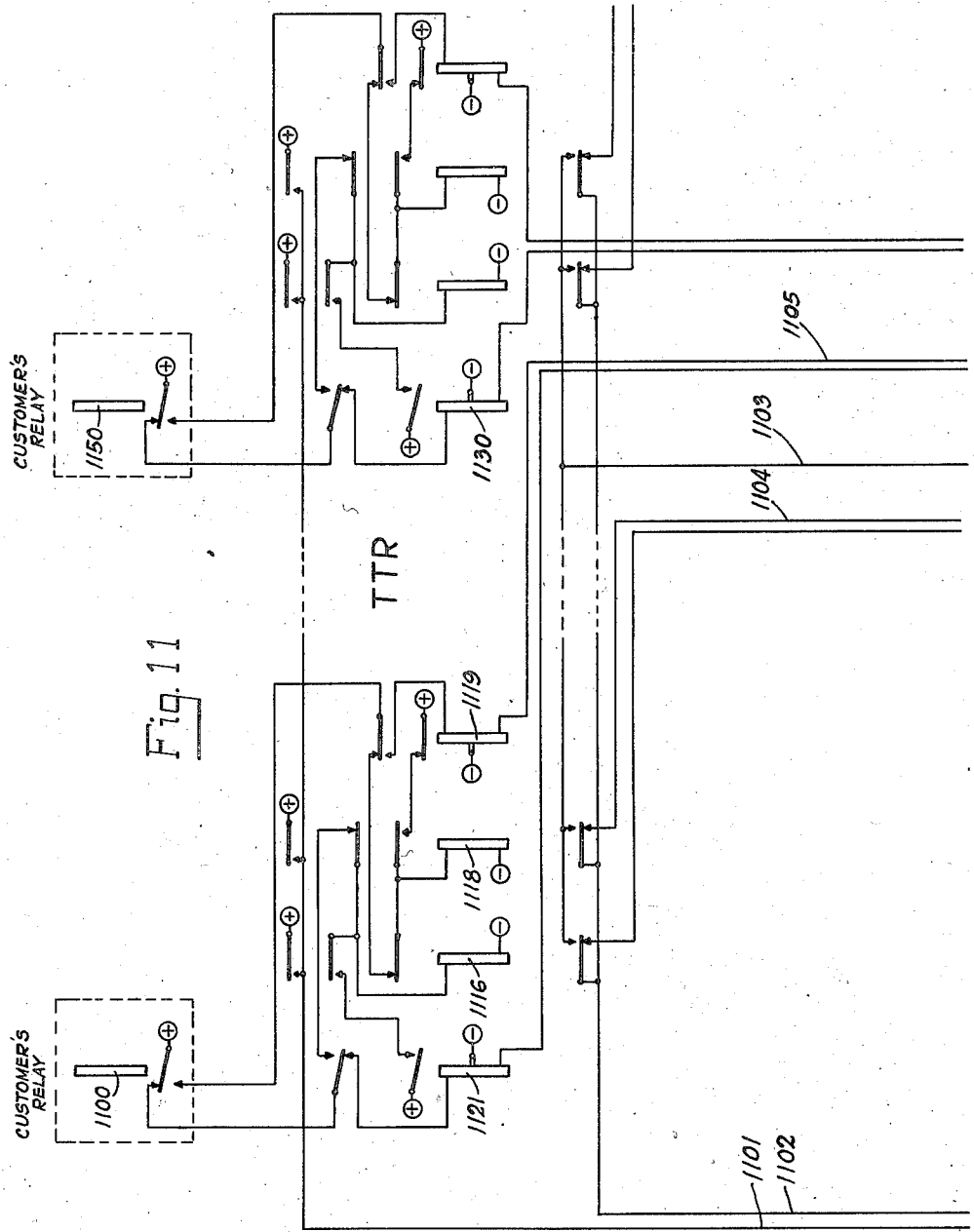

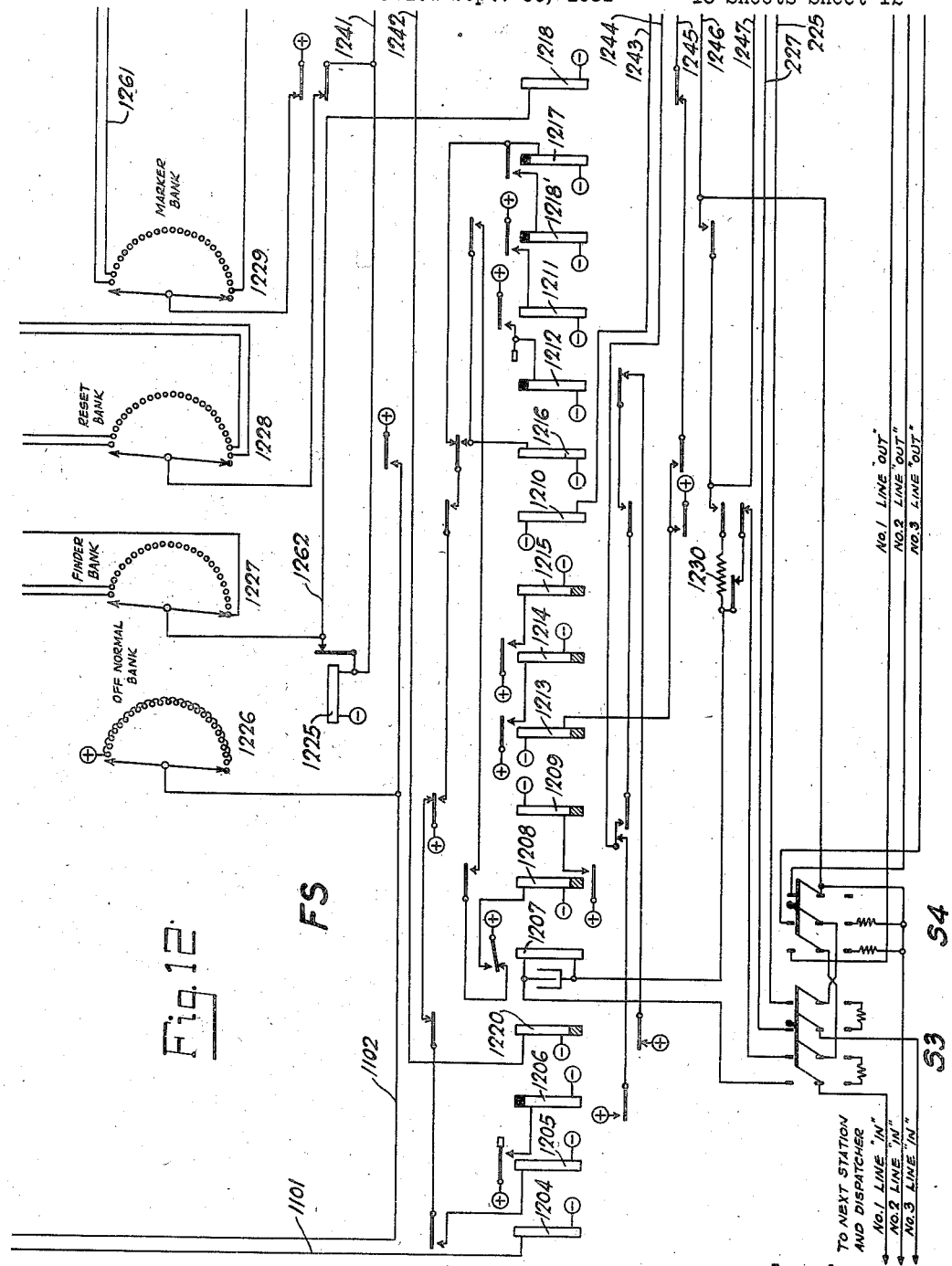

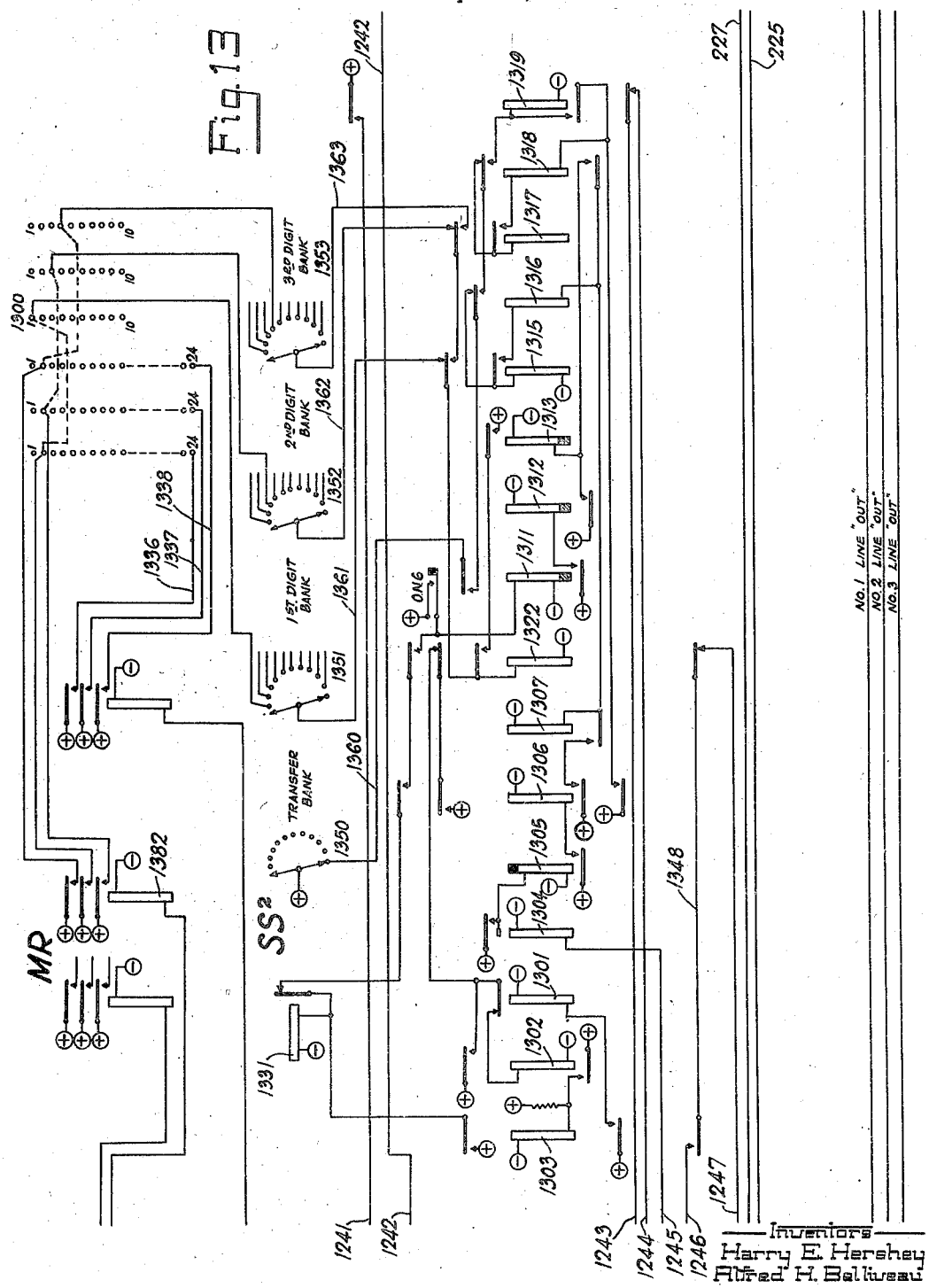

Patented July 14, 1936

2,047,631

UNITED STATES PATENT OFFICE 2,047,631

DISPATCHING SYSTEM

Harry E. Hershey, Oak Park, and Alfred H. Belliveau, Chicago, Ill., assignors, by mesne assignments, to Associated Electric Laboratories, Inc., Chicago, Ill., a corporation of Delaware Application September 30, 1931, Serial No. 566,078

4 Claims. (Cl. 177—353)

The present invention relates in general to dispatching systems, but is particularly concerned in the provision of a dispatching system in which any number of field stations may be interconnected, by a single set of line conductors, to a dispatcher's station.

Among the objects of the invention are: to provide a system of this general character with facilities whereby a dispatcher may rapidly select and operate one of a large plurality of pieces of equipment located in any remote field station and whereby, responsive to the operation of a piece of equipment at any field station, its operation is promptly registered at the dispatcher's station.

A further feature of the invention has to do with the provision of circuits and apparatus for enabling the dispatcher to select and operate equipment as mentioned at the same time that previously operated equipment is causing the registration of its operation to occur at the dispatcher's station.

Other features and objects have to do with the provision of circuits and apparatus in a system of the foregoing character which can also be arranged so that the dispatcher is prevented from selecting and operating a piece of field equipment while a field station is transmitting a recording indication or signal back to the dispatcher's station.

The form of the invention employed will, of course, depend upon the type of service required. Either system, however, has considerable utility as a train dispatching system, and in systems for the control of substation apparatus of power and fuel distribution systems. In illustrating and describing the invention, the substation equipment is represented as a customer's equipment, which obviously, may comprise any piece of apparatus or device which may be operated.

The invention is illustrated in thirteen sheets of drawings, comprising Figs. 1 to 13, respectively. Figs. 1 to 4, inclusive, when arranged with Fig. 1 immediately above Fig. 2 and with Fig. 3 to the right of Fig. 2 and with Fig. 4 to the right of Fig. 3, respectively, diagrammatically illustrates the apparatus and circuits of one field station of the system. The Figs. 5 to 8, inclusive, when arranged with Fig. 5 immediately above Fig. 6 and with Figs. 7 and 8 placed at the right of Figs. 6 and 5, respectively, diagrammatically illustrate the circuits and apparatus of the dispatcher's station of the system.

Figure 1:
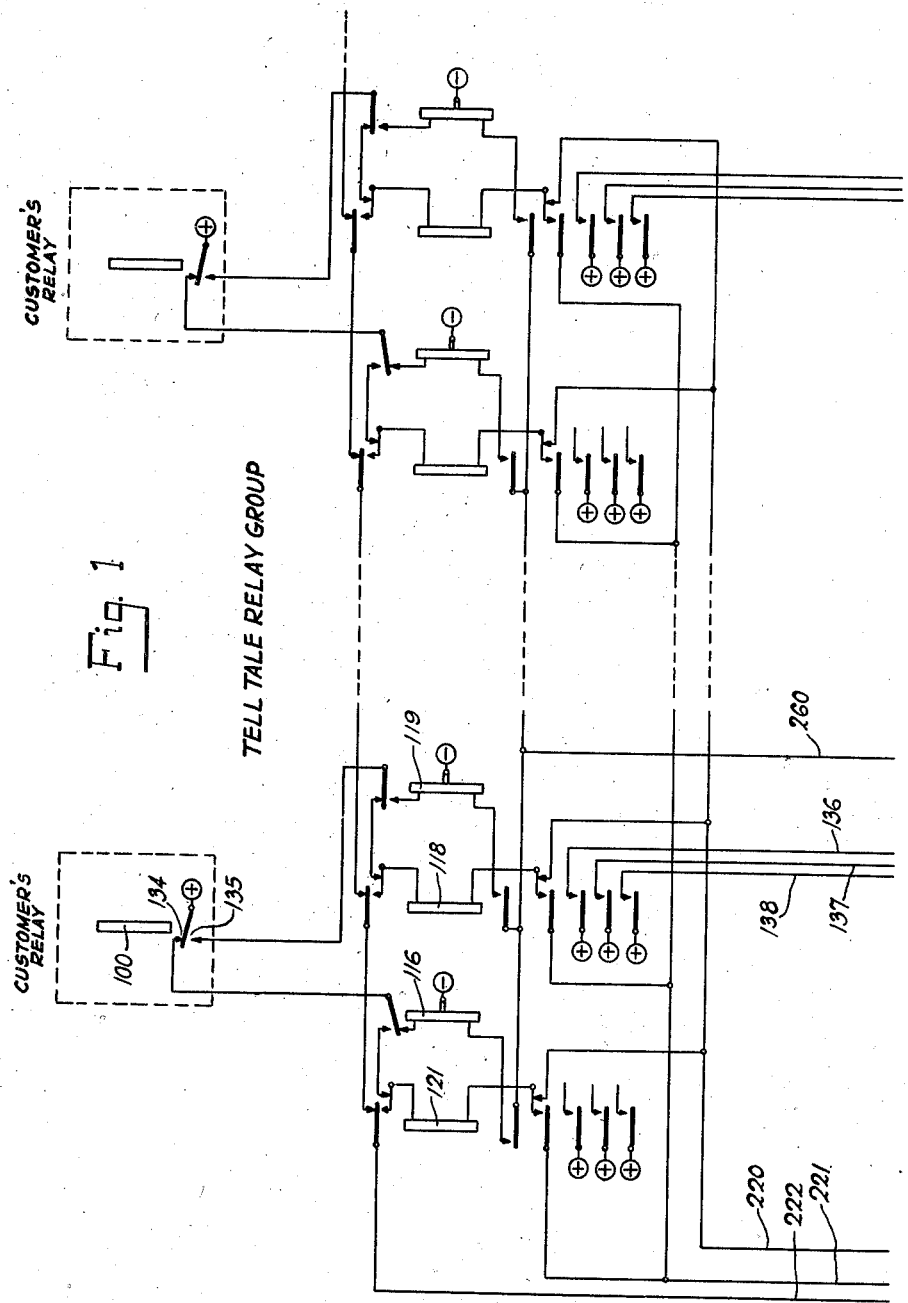
Figure 2:
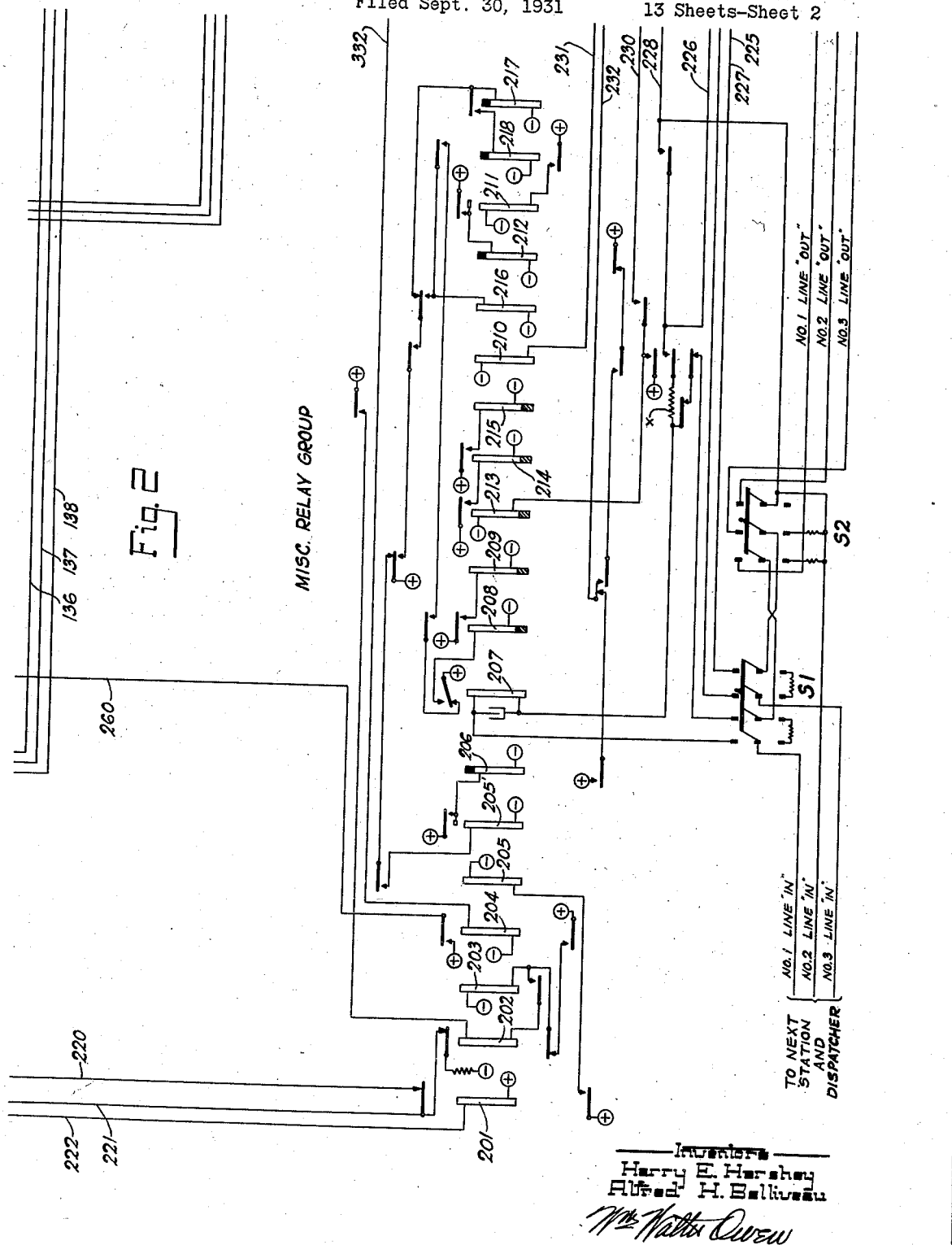
Figure 3:
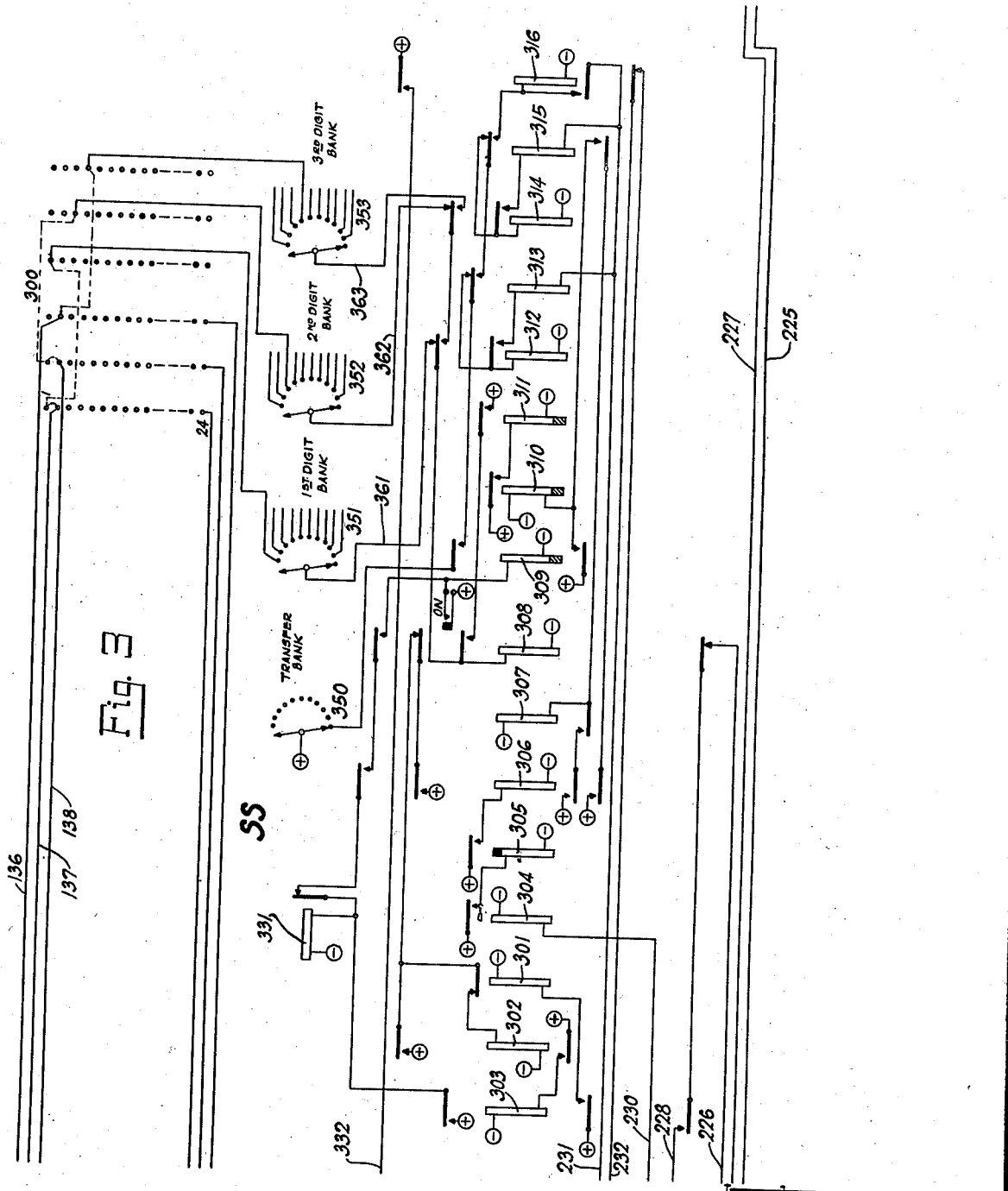
Figure 4:
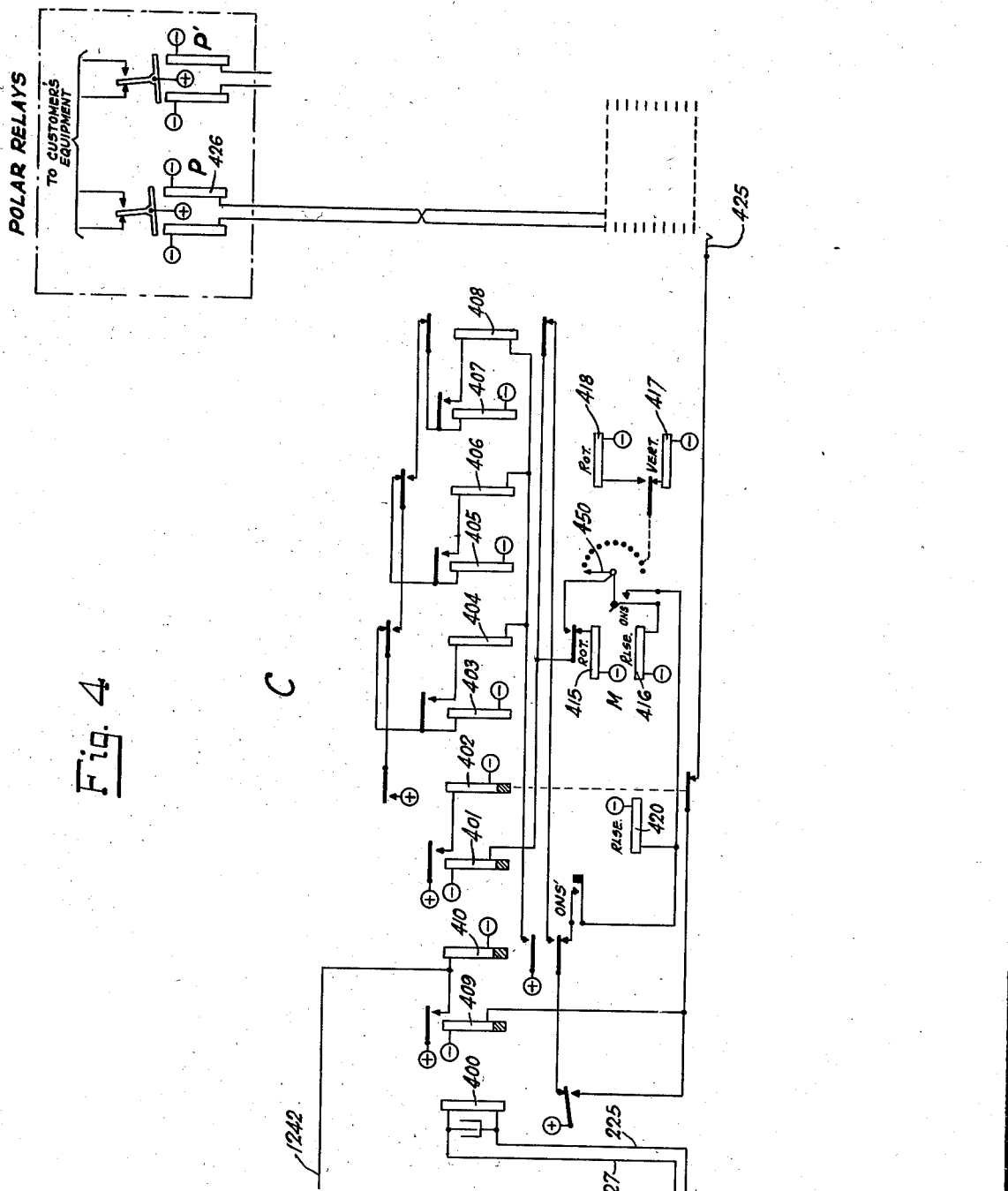

Figs. 11, 12, 13, and 4, when arranged with Fig. 4 to the right of Fig. 13, Fig. 12 to the left of Fig. 13, and with Fig. 11 immediately above Fig. 12, diagrammatically illustrate the apparatus and circuits of a field station of an alternative form of the system. Figs. 5, 8, 9, and 10, when arranged with Fig. 8 immediately above Fig. 10 and with Figs. 5 and 9 to the immediate left of Figs. 8 and 10, illustrate diagrammatically, the apparatus and circuits of the dispatcher's station of the alternative form of the invention.

In both types of systems the dispatcher's office and all of the stations are connected together by means of a three-conductor line circuit which extends throughout the system. The line circuit is arranged to be supplied with current supplied by a line battery located at the dispatcher's office, and under normal condition supplies negative potential to the line conductors $I$ and $3$ and positive potential to the common return conductor $2$. At each field station, as well as at the dispatcher's station, relays are included in series with the conductors $I$ and $3$, and the common return conductor $2$, and these relays control the apparatus at their respective stations to perform all functions necessary for the transmission and receiving of signals over the system.

The various relays diagrammatically shown throughout the drawings, except for the polar relays, are of the general type ordinarily employed in automatic telephone systems. The polar relays are of the stay-put type; i. e., their armatures always remain in their last operated position.

The sender switches SS, SS', SS², and SS³, are of the well-known single-motion pawl-and-ratchet type, arranged to advance their wipers upon each deenergization of their motor magnet.

The mechanisms of the incoming selector switch IS and of the minor switch M are also of the well-known single-motion pawl-and-ratchet type, but differ from the sender switches in that they always advance their wipers upon the energization of their motor magnets, and are provided with release magnets which function, when energized, to permit their wipers to restore under tension of their restoring springs.

The connector switches C and D', employed to select the polar relays, are of the well-known Strowger type.

It is believed that a most thorough understanding of the invention can be attained by describing the operation of the system.

Referring now particularly to the field station circuits and apparatus, comprising Figs. 1 to 4, it is assumed that all switches are at normal, and that all of the relays in the field station are in the position shown.

The relay 116 of the tell-tale relay group is energized and locked by way of the upper contacts of the customer's relay 100, because of a previous operation. The relay 207 of the miscellaneous relay group is energized because it is the "from-the-field" line relay of this station and is included in a normally-closed line circuit including all stations of the system. This circuit may be traced from the negative side of the line battery at the dispatcher's board, Fig. 5, over the No. 1 line to the dispatcher's line relay 800, No. 1 line "in" extending to the field station, through contacts of the station cut-out switch S1, through the winding of the field relay 207, the lower-break contacts of relays 215 and 210, respectively, through switches S1 and S2, respectively, out over No. 1 line "out", through the line relays of the succeeding field stations, not shown, and back over the No. 2 line, through the last station switch S2, to the No. 2 line "in" to positive potential at the dispatcher's station.

The polar relays P and P' are magnetically held in the position shown, because that happens to be their last operated position.

Field station tell-tale relay operation

It will now be assumed that the armature of the customer's relay 100 moves to its lower position. When this occurs, the relay 116 becomes deenergized, because of the opening of its circuit, which, as previously stated, included the upper contacts of the customer's relay 100. The deenergization of relay 116, is, however, without effect at this time. The relay 118 becomes energized over the circuit extending from positive potential supplied through the lower contacts of the customer's relay 100, the break contacts of relay 119, the inner-upper contacts of relay 118, the winding of this relay, its lower-break contacts, pick-up conductor 220, and through the break contacts of relay 201 and the upper break contacts of relay 202 to negative potential. The relay 118, upon operating, completes a locking circuit for itself which includes the winding of relay 201, conductor 222, the upper-break contacts of relay 121, the upper-make contacts of relay 118, its winding and its lower-make contacts, conductor 221, and the upper-break contacts of relay 202 to negative potential.

The relay 201, accordingly, operates and at its upper contacts removes negative potential from the tell-tale relay pick-up conductor 220. The tell-tale relay 118 also, at its three lowermost contact sets, connects positive potential to the conductors 136, 137, and 138. These conductors extend by way of the cross-connecting frame 300, and by appropriate jumpers thereat to the first, third, and fourth bank contacts, respectively, of the first, second, and third-digit banks 351, 352, and 353, thereby marking the code 134 on the sender to be subsequently transmitted. Furthermore, the relay 118 at its inner-lower make contacts prepares the circuit of re-set relay 119.

Field station miscellaneous relay operation

The relay 201, in addition to breaking the common pick-up circuit, for the tell-tale relays, at its make contacts completes the circuit of relay 205, which accordingly energizes and closes the circuit of relay 205' by way of the upper break contacts of relay 209. The relay 205' accordingly vibrates its contacts which eventually come to rest in closed position and in so doing complete the circuit of the slow-to-pull-up relay 206.

The relays 205' and 206 afford a delay feature, i. e., the time elapsing between the energization of relay 205' and the energization of relay 206 may be anywhere from one-tenth second to two seconds, depending upon the adjustment. At this time the delay feature has no apparent function, but the necessity for it will become apparent when a discussion is entered into concerning the lock-out feature.

The relay 206, upon operating, closes the circuit of relay 210, by way of the make-before-break contacts of relay 209, conductor 232, the break contacts of relay 316, and conductor 231. The relay 210, upon energizing, at its break contacts opens the No. 1 line; which, as previously explained, includes the "from-the-field" line relay 207 at each field station; at its inner-lower contacts closes a point in a locking circuit for itself, at its upper-make contacts prepares an operating circuit for the slow-to-pull-up relay 217 and a locking circuit for the relay 216, at its lowermost make contacts prepares the pulsing circuit which will subsequently be employed by the sender SS in transmitting a code back to the dispatcher's station, and at its middle-lower make contacts closes a point in the sender start circuit and completes the circuit of slow-release relay 213. This latter relay and the associated relays 214 and 215, respectively, operate in sequence, but their operation will be without effect at this time.

Consequent to the opening of the No. 1 line, the line relay 207 becomes deenergized and at its break contacts completes the circuit of slow-release relay 208, which, in turn, completes the circuit of slow-release relay 209. This latter relay, upon operating, at its lowermost contacts completes a locking circuit for relay 219, which is independent of the contacts of relay 206. This circuit extends from positive potential supplied through the break contacts of relay 212, the inner-lower make contacts of relay 210, the lower make contacts of relay 209, conductor 232, the break contacts of relay 316, conductor 231, and the winding of relay 210 to negative potential. The relay 209 also, at its upper contacts, opens the circuit of relay 205'; thereby permitting this relay and its associated relay 206 to restore to normal; and at its upper-make contacts completes the circuit of relay 217 by way of the upper-make contacts and upper-break contacts of relays 210 and 216, respectively.

The relay 217, upon operating, closes the same circuit to the relay 218 which, accordingly, energizes, and at its lower contacts closes a circuit from the No. 2 line "in" by way of the lower make contacts of relay 210, resistance X, and the winding of "from-the-field" line relay 207 to the No. 1 line "in" on the dispatcher's side of this station. The relay 207, accordingly, becomes energized again, thereby causing the energization of relay 216 over a circuit including the make-contacts of relay 207, the upper-make contacts of relay 208, and the upper-make contacts of relay 218. The relay 216, upon operating, at its upper contacts interrupts the formerly-traced circuit of relays 217 and 218 and completes a locking circuit for itself including the upper contacts of relay 210 and the upper-make contacts of relay 209. The relay 218, upon restoring, at its inner-lower make contacts again opens the circuit of relay 211, and at its lowermost contacts again separates the No. 2 line "in" from the No. 1 line "in". The deenergization of the "from-the-field" line relay 207 and of the other "from-the-field" line relays between the active field station and the dispatcher's station is thereby brought about.

Before going ahead with a description of the operation of the sender, it may be explained that the relays 211 and 212 provide a delay feature operative from relay 218 and constitute part of the lockout circuit which will be described subsequently. However, in the normal operation, relay 212 does not have time to function before the relay 218 has released again.

The foregoing operation of relays 217, 218, and 216 has thus resulted in a single pulse, of approximately two-tenths' second duration, being delivered by the "from-the-field" line relays, such as 207, between the sending field station and the dispatcher's station, and is termed the preliminary pulse.

It may be mentioned that the compensating resistance X is introduced in the pulsing circuit to take the place of the disconnected field line relays beyond this station, thereby maintaining the normal milliampere flow in the No. 1 line.

Relay 216, upon energizing, as before explained, at its uppermost break contacts interrupts the circuit of relays 217 and 218, thereby forestalling the operation of relay 212 (the foregoing operation having taken place within the delay time of relays 216 and 212), completes a locking circuit for itself at its upper-make contacts, and at its lower-make contacts completes the sender start circuit. This latter circuit extends from positive potential supplied through the middle-lower contacts of relay 210, the lower-make contacts of relay 216, conductor 230, and the winding of sender relay 304 to negative potential.

*Field sender switch operation*

The relay 304 closes its contacts after a slight delay and completes the circuit of slow-to-pull-up relay 305, which, in turn, completes the circuit of the sender start relay 306. The function of relays 304 and 305 is to introduce a delay of a suitable interval, after the release of the field line relays, such as 207, for the completion of the lockout function, and for the preparation of the dispatcher's incoming circuit.

The relay 306, upon operating, at its inner-upper contacts, closes a circuit for the relay 302 by way of the upper-break contacts of cut-off relay 308 and the break contacts of relay 301, at its lowermost contacts prepares the locking circuit of relays 312 to 316, inclusive, at its uppermost contacts prepares the homing circuit for the sender switch SS, and at its inner-lower contacts prepares a locking circuit for the relay 307 and a secondary locking circuit for the cut-off relay 308.

The relay 302 becomes energized over the previously traced circuit, at its lower contacts completes the circuit of relay 303, and at its upper contacts completes a locking circuit for itself including the break contacts of relay 301. The relay 303, upon operating, at its inner-lower make contacts completes the circuit of relay 301, which, in turn, opens the circuit of relay 302. The relays 301, 302, and 303, accordingly, interact so long as there is positive potential supplied to them through the middle-upper contacts of the cut-off relay 308.

Each time the relay 303 energizes, in addition to closing the circuit of the relay 301, at its lowermost contacts it transmits pulses from the No. 2 line, supplied with positive potential at the dispatcher's station over conductors 228 and 226 through the lower-break contacts of relay 308, through the lowermost make contacts of relay 210, compensating resistance X, and through the winding of line relay 207, to the No. 1 line, which, as previously explained, also passes through the "from-the-field" line relays 207 of all field stations intermediate to the sending station and the dispatcher, and which then extends through the "from-the-field" line relay 300 at the dispatcher's station to the negative terminal of the line battery.

These pulses, accordingly, operate the line relay 207 and the corresponding line relay at each field station intermediate to the sending station and the dispatcher. The line relays, through the medium of their resting contacts, maintain their associated slow-release relays, such as 208 and 209, energized during the pulsing operations because of their slow-to-release characteristic.

The relay 303 at its upper contacts also transmits pulses direct to the motor magnet 331 of the sender switch, causing the latter to take one step for each pulse delivered into the No. 1 line.

At the first step of the sender switch, the off-normal springs ON close, thereby causing the energization of the slow-release relay 309, which, in turn, completes the circuit of relay 310 and it, in turn, the circuit of relay 311. The relay 311, upon operating, prepares a primary locking circuit for the relay 308.

When the marked contact, in this instance the first, is reached by the wiper of the first-digit bank 351, the positive potential is applied over the conductor 137, extending from the tell-tale relay 118, through the cross-connecting frame 309, the first-digit bank 351, and its associated wiper, to the conductor 361, and through the break contacts of relay 312 and through the winding of cut-off relay 308 to negative potential. The relay 308, upon energizing, at its lowermost contacts opens the pulsing circuit to the No. 1 line, at its upper break contacts also opens the circuit extending to the relay 302 of the pulsing group, at its inner-upper contacts completes a locking circuit for itself, and at its uppermost contacts completes the "return-to-normal" circuit for the sender. This latter circuit extends from positive potential at the off-normal contacts ON, through the uppermost contacts of relay 308, the uppermost contacts of relay 306, through the break contacts of the motor magnet 331, and through the winding of this magnet to negative potential. The motor magnet will, therefore, operate in a buzzer-like manner to advance the wipers of the sender to their normal position, at which time the off-normal springs ON open and stop the sender in this position.

The slow-release relay 309 also deenergizes consequent to the opening of the off-normal springs ON. However, in the interval between the time the wiper of the transfer bank 350 reaches its normal contact and the restoration of the contacts of relay 309, a circuit is closed from positive potential on the wiper of the transfer bank 350 in its normal position, through the upper-make contacts of relay 309, the upper-break contacts of relay 313, and through the winding of relay 312, to negative potential. The relay 312, accordingly, operates and at its lower contacts prepares the circuit of relay 313, and at its upper contacts transfers the control circuit of cut-off relay 308 from connection with the conductor 361 and the associated first-digit bank 351, by way of the break contacts of relay 314, to the conductor 362 extending to the wiper of the second-digit bank 352.

As soon as the contacts of the relay 309 restore, the relay 313 becomes energized in series with the relay 312 over the circuit including the lower contacts of relay 306. Upon the energization of relay 313, this relay transfers the counting circuit from connection with the relay 312 to the relay 314, by way of the break contacts of relay 315.

Returning to a consideration of the action of the off-normal springs ON, it will be remembered that the relay 309 deenergized shortly after the sender returned to normal, thereby opening the circuit of the slow-release relay 310, which, in turn, opens the circuit of the slow-release relay 311. The relay 311, upon deenergizing, at its contacts opens the locking circuit of the cut-off relay 308, which, accordingly, deenergizes and causes the sender to transmit the second digit of the code. At this time the relay 308 is associated with the wiper of the second digit bank 352, and when the marked contact is reached, positive potential is applied over the conductor 138 extending from the tell-tale relay 118, through the cross-connecting frame 300, and the third bank contact of second-digit bank 352, its associated wiper, the conductor 362, the break contacts of relay 314, the upper-make contacts of relay 312, and the winding of cut-off relay 308 to negative potential.

The relay 308 will, accordingly, again operate, as before, to open the No. 1 line circuit to prevent the transmission of further impulses thereover, and this time three pulses will have been transmitted.

The sender switch will now return to normal, in the manner previously described, and when the same reaches normal the relays 314 and 315 will operate, in substantially the same manner as did relays 312 and 313 at the termination of the first digit of the code. The relay 314, at its upper contacts, transfers the lead extending to the cut-off relay 308 from connection with the conductor 362 of the wiper of the second-digit bank into connection with the conductor 363 terminating in the wiper of the third-digit bank 353. The relay 315, upon operating, at its upper contacts extends the counting circuit into connection with the relay 316, and at its lower contacts closes a point in a secondary locking circuit for the relay 308.

Upon the deenergization of relay 311, which, as previously explained, follows the deenergization of relays 309 and 310 consequent to the opening of the off-normal springs ON, the sender switch functions to send the third digit of the code. As soon as the off-normal springs ON have become operated, the relay 309 again becomes energized and at its lower contacts again completes the circuit of relay 310 and in addition completes the circuit of relay 307 by way of the lower contacts of relay 315. Consequent to the operation of relay 310, relay 311 also operates to again prepare the locking circuit of the cut-off relay 308. The relay 307, upon operating, at its contacts completes a locking circuit for itself and prepares the secondary locking circuit of the relay 308, by extending its own locking circuit from the lower contacts of the relay 306 to the relay 310, thus making the relays 310 and 311, as well as relay 308, independent of relay 309.

Since at this time the relay 308 is associated with the wiper of the third-digit bank 353, when the fourth bank contact, which in this instance is the one which is marked, is reached, relay 308 will operate as before to cut-off and prevent the transmission of more than four pulses to the No. 1 line.

The code is now completed, and the sender must not again function following the deenergization of relay 309. For this reason, the relays 310, 311, and 307 have been locked up through the inner-lower contacts of relay 306, as previously described.

Following the transmission of the third digit, and the restoration of the sender, and just prior to the deenergization of slow-release relay 309, the relay 316 is energized from positive potential supplied through the wiper and normal contact of transfer bank 359, over the previously-traced counting circuit. The relay 316, upon operating, at its inner-lower contacts completes a locking circuit for itself including the lower-most contacts of relay 306, at its uppermost contacts it places positive potential upon the re-set conductor 332, which extends to the winding of re-set relay 204, and at its break contacts opens the circuit of relay 210.

The relay 204, upon operating, at its lower contacts completes the circuit of relay 203 by way of the lower-break contacts of relay 202. The relay 203, accordingly operates and prepares the circuit of relay 202. The relay 204 also at its upper contacts, places positive potential on the common re-set conductor 260. This positive potential passes through the inner-lower closed make contacts of the relay 118, through the lower winding of re-set relay 119, to negative potential. The reay 119, accordingly, energizes and completes a locking circuit for itself including its upper contacts and the contacts 135 of the customer's relay 100. The operation of relay 119 is otherwise without effect at this time.

As previously mentioned, the locking circuit of the relay 210, of the miscellaneous relay group, is opened at the break contacts of relay 316. The relay 210, accordingly, at its middle-lower make contacts, opens the circuit of relay 304 of the sender, whereupon this relay opens the circuit of relay 305, and it, in turn, the circuit of relay 306, and these relays, accordingly, also restore. The relay 306, upon restoring, permits the restoration of the remaining operated relays of the sender as will subsequently be described. The relay 210, also, at its inner-lower contacts, opens a second point in its own locking circuit; at its upper contacts opens the locking circuit of relay 216, and a point in the operating circuit of relays 217 and 218, which relays have previously been deenergized; at its middle-lower make contacts also opens the circuit of slow-release relay 213, with the consequent deenergization of the associated slow-release relays 214 and 215; at its lowermost make contacts opens the pulsing circuit; and at its lowermost contacts re-closes a point in the No. 1 line circuit. This latter operation is without effect at this time, as the line is still open at the lower contacts of slow-release relay 215. After a delay interval introduced owing to the slow-release characteristics of relays 213, 214, and 215, the No. 1 line is again closed at the lower contacts of the latter relay. When this occurs, the line relay 207 will again become energized, and will again open the circuits of its associated slow-to-release relay 208, which, in turn, opens the circuit of slow-to-release relay 209. This station has thus released the line, which may now be seized by some other field station.

The slow-to-release relays 213, 214, and 215 afford the necessary delay required between the last digit of the code and the re-energization of the line relays for the last counting relay operation in the dispatcher's incoming selector IS.

Returning to a consideration of the release of the sender relays, as mentioned as occurring consequent to the release of relay 304, it will be seen that consequent to the release of this relay, relays 305 and 306 also become deenergized. The relay 306, in turn, opens the circuit extending to the relay 302 of the pulsing group, and the homing circuit of the sender switch, which, however, are already opened at this time. The relay 306 also by opening its lower contact sets causes the release of relays 307, 310, and 312 to 316, inclusive. Consequent to the deenergization of relay 310, relay 311 also deenergizes and opens the circuit of the cut-off relay 308, which, accordingly, also restores.

The relay 316, upon restoring, at its upper contacts, again opens the circuit of relay 204 of the miscellaneous relay group, and this relay, accordingly, also becomes deenergized. The relay 204, upon deenergizing, removes positive potential from the lower terminal of relay 202, and this relay accordingly energizes in series with the relay 203 to open the locking circuit of the tell-tale relay 118. Shortly after this, miscellaneous relay 215 releases, and at its upper contacts opens the circuit of relays 202 and 203, thereby permitting them to restore to normal. The relay 201, which was heretofore energized in series with the tell-tale relay 118, accordingly, also restores.

Second field tell-tale relay operation

If, previous to the operation just described, a second signal relay has become operated, its associated tell-tale relay will energize upon the release of tell-tale relay 118 and miscellaneous relay 201, whereupon the miscellaneous relay group will again function to attempt to seize the line, and, if successful, will start the sender to send the code marked by the newly-operated tell-tale relay.

To the field operation

When the dispatcher seizes the line, by operating a key representing a function to be performed in the field as will subsequently be described, all of the "to-the-field" line relays, such as 400 of the connector C and which are included in the No. 3 line, will deenergize, and complete the circuit for their associated slow-release relay 409. This relay in turn completes the circuit of slow-release relay 410. This latter relay, upon operating, at its inner-lower contacts prepares a holding circuit for the relays 403 to 408, inclusive, at its lowermost contacts opens a point in the circuit of release magnets 420 and 416, and closes a point in the operating circuit of slow-release relay 401 and the operating magnet 415 of the minor switch M.

It will be assumed that the key operated by the dispatcher causes the transmission of the code 001, the digit 0 of the code comprising ten pulses. The line relay 400 will, accordingly, respond to each of the ten pulses comprising the first digit 0. The slow-to-release relay 409, however, will not fall away during the momentary interruptions of its circuit, and, therefore, at each operation of relay 400 a circuit is closed by way of its front contacts, the front contacts of relay 410, the lower-break contacts of relay 408, to the slow-release relay 401 and negative potential. A branch of this circuit also extends by way of the lower break contacts of relay 404 through the magnet 415 of the minor switch M to negative potential.

Consequent to the transmission of the ten impulses comprising the first digit 0, the minor switch rotates its wiper 450 into engagement with its tenth bank contact. The slow-to-release relay 401 energized responsive to the first impulse of the digit and, owing to its slow-release characteristic, remains operated throughout the series of pulses. The relay 401, upon operating, completes the circuit of slow-release relay 402 which, in turn, completes the circuit of counting relay 403 by way of the upper-break contacts of relay 404. The relay 403, upon operating, extends the positive potential, applied to the upper terminal of relay 403, to the upper terminal of relay 404, but without effect at this time since there is already positive potential connected with the lower terminal of this relay.

At the termination of the transmission of the first series of pulses, relays 401 and 402 become deenergized. The latter relay, upon restoring, removes positive potential from the upper terminals of the relays 403, 404, and the latter relay, accordingly, energizes in series with the relay 403. The relay 404, upon operating, at its upper contacts transfers the counting circuit from connection with the terminal of relay 403 into connection with relay 405 by way of the upper break contacts of relay 406, and at its lower contacts transfers the pulsing circuit branch formerly extending to magnet 415 into connection with the wiper 450, which, consequent to the transmission of the first digit, has been positioned in engagement with its tenth bank contact, and which has a circuit extending therefrom through to the lower-break contacts of relay 406 to the vertical magnet 417 of the Strowger switch C.

The second series of pulses received by the line relay 400 will, accordingly, be transmitted to the vertical magnet 417, and to the slow-release relay 401. This time, consequent to the energization of relay 401 and its associated relay 402, counting relay 405 is energized during the transmission of the second digit followed by the energization of relay 406 upon the termination of the transmission of the second digit. The relay 406, upon operating, extends the counting circuit to the relay 407 by way of the upper contacts of relay 408, and at its lower contacts transfers the pulsing circuit from connection with the vertical magnet 417 of the connector into connection with its rotary magnet 418. Consequent to the transmission of the second digit, comprising ten impulses, the connector wiper 425 is elevated opposite the tenth level of its bank contacts.

The next and final digit of the code comprising one pulse causes the rotary magnet 418 to position the wiper 425 into connection with the first bank contact in the tenth level of its bank, and the energization of relay 401 as before. This time the associated relay 402, upon operating, completes the circuit of relay 407, which, in turn, prepares the operating circuit of relay 408. Upon the termination of the transmission of the third and final digit of the code, the relay 408 becomes energized in series with relay 401. Relay 408, upon operating, at its upper contacts opens the counting circuit and at its lower contacts opens the pulsing circuit.

When the relay 402 deenergizes following the last operation of rotary magnet 418 the coil 426 of the polar relay P becomes energized from positive potential supplied through the break contacts of line relay 400, the break contacts of slow-release relay 402, and the wiper 425. The armature and contacts of the polar relay P will, accordingly, assume the position alternate to that shown, thereby closing the operating circuit of the customer's equipment, as required.

The code to the field is now complete and the dispatcher's equipment will again close the No. 3 line, thereby energizing all "to-the-field" line relays, such as 400. Consequent to the energization of relay 400, its associated relays 409 and 410 will again become deenergized. The relay 410, upon restoring its contacts, interrupts the locking circuit of the counting chain comprising relays 403 to 408, inclusive, thereby permitting these relays to restore to normal, and at its lowermost contacts applies positive potential by way of the off-normal springs ONS' to the release magnet 420 of the connector C, and by way of the off-normal springs ONS to the release magnet 416 of the minor switch M, and these switches, accordingly, restore to their normal position.

It may be explained that the minor switch at each field station will respond to the first digit, but the second and third digits of a code will be ineffective except for such connectors, in this instance, those having a pulsing circuit which is led through the tenth contact of their associated minor switch, and only one of these will find a polar relay coil associated with bank contact 001. It should also be noted that the wiper 425 of the Strowger switch is open during the rotation at the lower contacts of relay 402, so that no polar relay will be operated while the wiper 425 is passing from one bank contact to another. It may be also noted that during the release operation of the switch positive potential is removed from connection with the wiper 425 at the break contacts of line relay 400, so that improper operation of a polar relay cannot occur at this time.

Field locks out field

It will now be assumed that a field station seizes the line, in which event all other field stations are locked out, but there is a slight difference in the manner of locking out, depending upon whether the trying field station is between the one which has seized the line or whether it is beyond the station which has seized the line.

"Trying station" between

In accordance with the above assumption, the relays 208 and 209 of the miscellaneous relay group, in all stations intermediate the dispatcher and the station which has seized the line, are energized; therefore, a "between" station is locked out because there can be no circuit established for relay 205', because of the upper break springs of relay 209 being opened.

"Trying station" beyond

In accordance with the foregoing assumption, miscellaneous relay 210, of the station which has seized the line, has opened the No. 1 line at its lowermost contacts. Therefore, the line relay 207 in all of the "beyond stations" is deenergized, while the associated relays 208 and 209 thereof are energized. A "beyond station" is, therefore, locked out because there can be no circuit established for relay 205' thereof, because of the upper break springs of relay 209 being opened. Also, since the No. 1 line, is opened at the lower break contacts of relay 210 of the field station which has seized the line, all stations beyond it will have their line relay circuits held open until the line is released at the completion of the transmission of the code by the field station which has seized the line.

Simultaneous field operations

Two field stations may function so that their relays 210 of their miscellaneous relay groups become energized simultaneously. The station near the dispatcher will function normally and seize the line. The "beyond" station will lockout as follows:

The line relay 207 will be deenergized by the operation of the relay 210, as in the normal operation of seizing the line. The relays 208 and 209 will, accordingly, operate in the usual manner, and the relay 209 will complete the circuit of slow-to-pull-up relay 217, and subsequently relay 218. The relay 218, upon operating, at its lower contacts, will attempt to send the "preliminary pulse" to the line relay 207, as in the normal operation, but cannot do so because the No. 1 line has been opened at the "nearer" station by the operation of its relay 210. Therefore, since the relay 207 of the station beyond does not receive the required preliminary pulse, it cannot complete the circuit of relay 216, as it does in the normal operation of seizing the line. Owing to the fact that relay 216 fails to energize, the circuit to slow-to-pull-up relays 217 and 218 is held closed for a sufficient period to allow the operation of the associated relays 211 and 212. This latter relay, upon operating, interrupts the locking circuit of the associated relay 210. The relays 217 and 218 are slow-to-pull-up to allow ample time for the energization of relays 208 and 209 before the station tries the "preliminary" pulse.

The relay 210, upon deenergizing, at its upper contacts opens the operating circuit of relays 217 and 218, thus locking out this station. Relays 211 and 212 will release in turn upon the deenergization of relay 218, and all relays in this station will be once more in their normal position, with the exception of the operated tell-tale relay and relays 201, 207, 208, and 209 of the miscellaneous relay group.

When the line is again free, the energization of the line relay 207 and the release of relay 209 of the miscellaneous relay group will again cause the relay 205' to "try" the line. If it is successful in causing the energization of relay 216 all other stations are locked out until after the completion of the transmission of the signal from this station.

Circuit operation of the dispatcher's station equipment

Referring now to the dispatcher's station equipment comprising Figs. 5 to 8, inclusive, wherein all switches are in their normal position, the tell-tale relay 616 is energized because the "first" operate key is positioned in engagement with its lower contacts. The incoming selector relay 800 is energized because it is the "from-the-field" line relay. The polar relays P3 and P4 of the return indication polar relay group and the polar relays P5 and P6 of the automatic indication polar relay group all have their armatures moved toward the left as that happens to be their last-operated position.

It will now be assumed that the dispatcher moves the "first" operate key into engagement with its contact 001.

*Tell-tale relay operation at the dispatcher's station*

Consequent to movement of the "first" operate key, the tell-tale relay 616 will become deenergized, but without effect at this time. The telltale relay 618 will operate from positive potential supplied through the "first" operate key its contact 001, conductor 550, the break contacts of relay 619, the inner-upper break contacts of relay 618, the winding of this relay, its inner-lower break contacts, the pick-up conductor 620, through the break contacts of relay 601, the upper-break contacts of relay 602, to negative potential. The relay 618, upon operating, completes a locking circuit for itself including the relay 601. This circuit extends from positive potential, through the winding of relay 601, holding conductor 622, the upper-break contacts of relay 621, the upper-make contacts of relay 618, its winding, its lower make-before-break contacts, conductor 621', and through the upper-break contacts of relay 602 to negative potential. The relay 618 also, at its inner-lower make contacts prepares an operating circuit for the reset relay 619, and at its three lowermost sets of contacts applies marking potential to conductors 636, 637, and 638, terminating in the cross-connecting frame 700. These conductors are further connected by means of jumpers to the tenth bank contacts of the first and second-digit banks 751, 752, and to the first bank contact of the third-digit bank 753 of the sender switch SS'.

The relay 601 of the miscellaneous relays operates over the traced circuit; at its upper contacts interrupts the common pick-up circuits for the tell-tale relays, so that no other tell-tale relay can operate until the first-operated tell-tale relay has been restored and the relay 601 deenergized.

*Operation of the miscellaneous relays at the dispatcher's station*

In this form of the invention the dispatcher at all times has access to the field stations, therefore, the relay 601 at its lower contacts transmits positive potential to the relay 704 of the sender direct.

*Operation of the dispatcher's sender*

The relay 704, upon operating, at its break contacts opens the No. 3 line, which, at the dispatcher's station, includes the lower-break contacts of relay 727, conductor 643, the lower-break contacts of relay 704, and then extends as the No. 3 line "out", and at its make contacts completes the sender start circuit which extends from positive potential supplied through contacts of relay 704, the lower-break contacts of relay 606, conductor 640, to the relay 704' and negative potential. The relay 704' upon operating, completes the circuit of slow-to-pull-up relay 705, which, in turn, completes the circuit of sender-start relay 706. The time interval introduced by relays 704' and 705 provides the necessary time interval between the opening of the No. 3 line and the starting of the pulsing operation. The relay 706, upon operating, at its upper-make contacts completes a circuit by way of the upper contacts of relay 722 and by way of the contacts of relay 701 to the relay 702 and negative potential, causing this relay 702 and its associated relays 701 and 703 to inter-act to operate the sender SS' and to transmit pulses over the No. 3 line in the same way that these operations are performed by similar relays 301 to 303 in the sender of the field station. The relay 706 also, at its inner-lower contacts, prepares the "return-to-normal" circuit of the sender, at its middle-lower contacts prepares a locking circuit for relay 714, and at its lowermost contacts prepares a locking circuit for relays 715 to 718, inclusive, and for relay 604 of the miscellaneous relays, and at its inner-upper contacts completes the operating circuit of the slow-release relay 725. This latter relay, upon operating, causes the operation of slow-release relays 726, 727, 728, 729, and 710 in sequence.

At the first step of the sender switch SS' off-normal springs ONS2 close, thereby completing an energizing circuit for the slow-release relay 711. This relay, in turn, causes the energization of relays 712 and 713, respectively. When the wiper of the first-digit bank 751 reaches the tenth bank contact ten pulses have been transmitted over the No. 3 line and the wiper picks up positive potential originating at the make contacts of the operated tell-tale relay 618, and supplied through conductor 637 and through the cross-connecting frame 700 to the tenth contact of the bank 751, through its associated wiper 761, the break contacts of relay 715, and the winding of cut-off relay 722 to negative potential. The relay 722, accordingly operates; at its lower-break contacts opens a point in the No. 3 line circuit to prevent the further transmission of pulses thereover, at its upper-break contacts it opens the circuit extending to the pulsing relay group, at its inner-upper contacts completes a locking circuit for itself including the contacts of slow-release relay 713, and at its inner-lower contacts completes the "return-to-normal" circuit of the sender. This circuit extends from positive potential supplied through the off-normal springs ONS2, the lower-make springs of cut-off relay 722, the inner-lower make springs of relay 606, and the interrupter springs and rotary magnet 731 of the sender switch.

The motor magnet 731 will now act as a buzzer and return the sender switch to normal position, at which time the off-normal springs ONS2 again open the circuit to the motor magnet, and to the associated slow-release relay 711. Relay 711 is, accordingly, restored, bringing about the restoration of slow-release relays 712 and 713, respectively. The relay 713, upon restoring, opens the locking circuit of cut-off relay 722, thereby permitting it to restore. The slow-to-release relays 711, 712, and 713 provide the necessary time interval between the digits which is necessary to allow connector relays 409 and 410, at all field stations, to deenergize.

When the wiper associated with bank 750 of the sender reaches its normal contact, the energizing circuit of relay 715 is closed by way of the upper-break contacts of relay 716 and the make contacts of slow-release relay 711. This circuit is opened when the relay 711 deenergizes, whereupon the relay 716 will energize and lock up in series with the relay 715. The relay 715, upon operating, at its inner-upper contacts prepares the operating circuit of relay 716, and at its upper contacts transfers the control of cut-off relay 722 from connection with conductor 761 into connection with the second-digit bank by way of the upper-break springs of relay 717 and conductor 762.

When the relay 722 becomes deenergized, consequent to the release of slow-release relay 713, the sender again begins to function to transmit the second digit "0" of the code, and the marked contact is found as the tenth contact in the second-digit bank 752. Consequent to the wiper of bank 752 encountering positive potential thereon, the cut-off relay 722 is again operated to discontinue the transmission of pulses over the No. 3 line and to bring about the restoration of the sender switch wipers.

When the wipers return to normal, positive potential, supplied from the bank 750, operates the counting relay 717. This relay, accordingly, transfers the operating circuit of the cut-off relay 722 from connection with the conductor 762 into connection with conductor 763 extending to the wiper of the third-digit bank 753. Subsequently, upon the restoration of slow-release relay 711, the relay 718 energizes in series with the relay 717. The relay 718, upon operating, extends the counting circuit to the relay 604 of the miscellaneous relays by way of the conductor 642 and the upper-make contacts of relay 718, and at its lower contacts prepares an operating circuit for relay 714.

When the cut-off relay 722 becomes deenergized for the second time the sender again functions, to transmit the third digit of the code. As soon as the off-normal springs ONS2 are closed, relay 711 again becomes energized and at its lower contacts now completes the circuit of relay 714 by way of the lower-make contacts of relay 718. Relay 714, upon operating, completes a locking circuit for itself and for the relay 712, which includes the middle-lower contacts of relay 706, so that the locking circuit of the cut-off relay 722 is now dependent upon relay 706 instead of being dependent on the holding of relays 712 and 713 energized by the relay 711.

The marked contact, in the case under consideration, will be found now as the first contact in the third-digit bank 753. When the sender returns to normal, following the sending of the last digit "1" of the code, the counting circuit will cause the energization of relay 604. This circuit extends from positive potential on the wiper of bank 750, over the conductor 754, the upper-make contacts of relay 711, the upper-make contacts of relays 716 and 718, respectively, and the conductor 642 to the winding of relay 604 to negative potential. The relay 604, upon operating, at its lowermost contacts completes a locking circuit for itself including the conductor 641 and the lower-make contacts of relay 706 of the sender, and at its inner-lower make contacts completes a circuit for the relay 606. This latter relay in turn operates and completes a locking circuit for itself by way of its inner-lower contacts, the conductor 639, and the make contacts of relay 710 of the sender, and at its break contacts opens the start circuit to the relay 704' of the sender. The relay 604, in addition to completing the circuit of relay 606, at its upper contacts completes the circuit of relay 605. This latter relay, upon operating, at its upper contacts places positive potential upon the re-set conductor 638, through the inner-lower make contacts of tell-tale relay 618 and the lower winding of re-set relay 619 and negative potential. The relay 619, accordingly, energizes, and locks itself up over a circuit including its upper winding, its upper-make contacts, the conductor 558, the contact 001, and positive potential on the "first" operate key.

The deenergization of relay 704' of the sender following the opening of a circuit by the restoration of the inner-lower make contacts of relay 604, causes the deenergization of the associated relays 705 and 706. The relay 706, upon restoring, at its lowermost contacts interrupts the locking circuit of relay 604. This relay and the associated relay 605, accordingly, become deenergized. The relay 605, upon restoring, removes positive potential from the re-set conductor 638, and at its lower contacts removes positive potential from the lower terminals of relays 602 and 603. The relay 602, which has heretofore been shunted by the positive potential on its lower terminal, now energizes in series with relay 603. Relay 602, upon operating, at its lower contacts opens a point in the initial operating circuit of relay 603, and at its upper contacts removes negative potential from the hold conductor 621, thereby causing the restoration of the tell-tale relay 618 and of the relay 601 of the miscellaneous relay group, and these relays accordingly restore. The relay 601, upon restoring, at its upper contacts closes a point in the pick-up circuit, and at its lowermost contacts opens the circuit of the sender relay 704.

As a further result of the deenergization of relay 706, the associated relays 725 to 729, inclusive, 710 and 712 to 718, inclusive, become deenergized. The relay 727, upon restoring, replaces negative potential on the No. 3 line "out" by way of conductor 643 and the break contacts of relay 704. The delay of slow-to-release relays 725, 726, and 727 produces the time interval required between the last pulse of the code and the reenergization of the "to-the-field" line relays, such as the relay 400.

The slow-release relay 713, upon restoring, opens the locking circuit of cut-off relay 722, and this relay accordingly also restores to normal.

The delay of slow-to-release relays 728, 729, and 710 produces the time interval which is required between the reenergization of the "to-the-field" line relays and the start of a second code. The slow-to-release relay 710, upon restoring, opens the common circuit of relays 606, 602, and 603 and these relays, accordingly, restore their contacts. The restoration of relays 606 and 603 is without effect. The relay 602, however, at its upper contacts again applies negative potential to the pick-up conductor 620 so that another tell-tale relay may now operate.

Additional tell-tale relay operation

If it so happens that other operate keys are also operated, previous to the completion of the code, the foregoing operations will be repeated, a new tell-tale relay being energized each time the relay 602 restores, until the code has been sent for each operate key that has changed position, the tell-tales coming up in succession, in the order of their nearness, from the circuit standpoint, to the miscellaneous relay 601.

Operation of the incoming selector IS

Since in an ordinary installation the total number of "from-the-field" indications will exceed the capacity of the connectors employed, the incoming selector IS has been provided. This switch responds to the first digit and serves to direct the remaining digits to the proper connector switch. These switches consist of mechanisms only, there being no relays required.

In the process of a field station seizing the line, it will be remembered that the No. 1 line is opened, whereupon the relay 800 of the incoming selector will fall away and cause the operation of its associated slow-release relays 811 and 812, respectively.

When the field station sends the preliminary pulse over the No. 1 line, the line relay 800 will energize momentarily and close a circuit by way of its make contacts, the lower-make contacts of slow-release relay 812, the lower-break contacts of relay 808, and the lower break contacts of relay 814 to the winding of relay 813 and negative potential. At the termination of this pulse the relay 814 will energize in series with the relay 813. Thus, it will be seen that relays 812 and 813 have absorbed the preliminary pulse. Relay 814 at its contacts transfers the pulsing circuit; which extends from the front contacts of relay 800, and which, as traced, extends by way of the lower-make contacts of relay 812 and the break contacts of relay 808 to conductor 860; from connection with relay 813 into connection with conductor 852 through relay 801 to negative potential, and by way of the lower-break contacts of relay 804 to the selector switch magnet 815 to negative potential.

It will be assumed that the field sends the code 234. Under these circumstances the relay 800 will momentarily energize twice in response to the first digit, and will send two impulses to the magnet 815, which will actuate and move its wipers 851 and 851' into engagement with their second bank contacts.

The relay 801 also energizes responsive to the first pulse of the series and will remain energized throughout the series of pulses, and will close the circuit of its associated slow-release relay 802. This latter relay completes a circuit for relay 803 by way of the upper-break contacts of relay 804. Upon the completion of the impulse series the slow-release relays 801 and 802 become deenergized, and, upon the removal of positive potential from the upper terminals of relay 803 and 804 the latter relay becomes energized in series with relay 803. The relay 804, upon operating, at its upper contacts, transfers the counting circuit from connection with relay 803 into connection with relay 805 by way of the upper-break contacts of relay 806, and at its lower contacts transfers the extended pulse conductor 852 from connection with magnet 815 into connection with the vertical magnet 570 of the second connector D'. This circuit extends by way of the lower-break contacts of relay 806, the wiper 851 and its second bank contact, conductor 853 and the winding of the vertical magnet 570 to negative potential.

The relay 800 will momentarily energize three times in response to the second digit of the code and will, accordingly, send three pulses by way of the traced circuit to the vertical magnet of the second connector. The counting circuit will cause the operation of relay 805, followed by the energization of its associated relay 806 following the completion of the transmission of the second digit. The relay 806, upon operating, extends the counting circuit to the relay 807 by way of the upper-break contacts of relay 808, and at its lower contacts transfers the pulsing circuit from connection with the wiper 851 into connection with the wiper 851' and its second bank contact, over the conductor 854 to the rotary magnet 571 of the second connector.

The relay 800 will momentarily energize four times in response to the third digit of the code, and will, accordingly, send four pulses over the traced circuit to the rotary magnet of the second connector. The counting circuit will cause the energization of counting relay 807, followed by the energization of relay 808 when the transmission of the third digit of the code has been completed. This latter relay, upon operating, at its upper contacts opens the counting circuit, while at its lower contact it opens the pulsing circuit.

As a result of the foregoing operation the wiper 525 of the second connector has been brought into engagement with the thirty-fourth bank contact thereof. When the relay 802 deenergizes, following the transmission of the last digit of the code in addition to permitting the operation of counting relay 808, it completes, at its uppermost break contacts, a circuit through the right-hand winding of the polar relay P3. This circuit extends from positive potential at the break contacts of relay 800, through the upper-break contacts of relay 802, conductor 855, the wiper 525, now in engagement with the thirty-fourth bank contact, and the right-hand winding of polar relay P3, to negative potential. This relay will, accordingly move its armature to the right, thereby interrupting the circuit of the green lamp G and establishing a circuit for its red lamp R, as an indication that the represented customer's equipment has changed to a corresponding position in the field.

Upon completion of the code "from-the-field", the No. 1 line circuit remains closed, whereupon the relay 800 again becomes energized, causing the deenergization of its associated slow-release relays 811 and 812. Upon the restoration of relay 812, the release circuit of magnet 816 of the incoming selector and of the release magnet of the connector D' is completed, from the positive potential supplied through the make contacts of relay 800, the break contacts of relay 812 to conductor 856. From this conductor one branch extends by way of the off-normal springs ON4 and the winding of release magnet 816 to negative potential and the other branch extends by way of the off-normal springs ON5 and the winding of release magnet 572 of the second connector D' to negative potential.

It will be noted that the wiper 525 of the connector is held open during the release operation of the switch, owing to the energized condition of the "from-the-field" line relay 800 and, therefore, no improper operation of a polar relay can occur during the release operation of D'.

*Automatic indication*

The indications received from the field stations may be divided into two classes, first, indications which return as a result of operations brought about by the dispatcher, and, second, automatic indications which occur as the result of some change in the field not originated by the dispatcher.

This latter type of indication is required in railroad operation wherein the train dispatcher receives an indication of a train having run in on a siding, and is commonly known as an O. S. indication. It sometimes is desired that an indication of this character be "locked-in", even though the change in the field is only temporary. To accomplish this, the "locked-in" key is provided on the dispatcher's board.

It may also be desirable, in certain instances to obtain a printed record of the time of occurrence of the change of an automatic indication. This is arranged for by the provision of pairs of relays 501 and 502 placed intermediate to the contacts on the automatic indication polar relays and their indicating lamps.

It will be assumed that a "from-the-field" code causes the connector D' to position its wiper upon its eleventh contact and thereby causes the automatic indication polar relay winding 528 to move the associated armature to the right. The relay 502, accordingly, becomes deenergized. With the armature of winding 528 in its new position, a circuit is completed to the slow-to-operate relay 501. Since this relay is slow-to-operate a continuation of the circuit momentarily extends through its break contacts to the printer and back through the break contacts of relay 502 and the winding of this relay to negative potential. The printer will, accordingly, operate, and, after a delay, the relay 501 will then operate and open the circuit of the printer, and at its upper contacts close the circuit of the associated lamp.

If the locking key is in its operated position the relay 501 remains locked up, instead of becoming deenergized when the polar relay again changes its position. Obviously, if the armature of the polar relay is in the position opposite to that shown and its winding 529 is selected, the armature will be restored to its shown position. In this case, the circuit of relay 501 is interrupted, and that of relay 502 again completed. However, prior to the opening of the contact of this relay a circuit will again be established for the associated printer.

Alternative form of the system

Referring now particularly to the field station circuits and apparatus, comprising Figs. 11 to 13, and 4, the operation of these field circuits will be gone into. The relays 1121 and 1130 of the tell-tale relay group TTR are energized and locked up to their upper make contacts and the make contacts of the associated customer's relays 1100 and 1150, because of previous operations. The relay 1207 is energized because it is the "from-the-field" line relay of this station and is included in a normally closed line circuit including all stations of the system.

The polar relays P and P' are magnetically held in the position shown, because that happens to be their last operated position.

Field station tell-tale relay operation

To describe this operation it is assumed that the armature of the relay 1100 is moved into engagement with its back contact. When this occurs the relay 1121 becomes deenergized, but without effect at this time. Consequent to the armature of the relay 1100 changing its position, a circuit is completed for the tell-tale relay 1118 from positive potential supplied through the lower contact of relay 1100, through the upper-break contacts of relay 1119, the inner-upper break contacts of relay 1116, and through the winding of relay 1118 to negative potential. This latter relay, upon operating, at its inner-upper contacts completes a locking circuit for itself including the inner-upper break contacts of relay 1119; at its upper-break contacts opens a point in the operating circuit of relay 1116 to prevent the possible movement of the armature of relay 1100 back to its initial position, before the transmission of the code initiated by this armature dropping away has been completed, from interfering with the transmission of the initiated code; at its lowermost contacts disconnects the conductor 1104, connected to the second bank contacts of finder bank 1227, from the finder-start conductor 1102 and connects this conductor, through the lower-make contacts, to the kick-off common conductor 1103, connected to the last contact in the bank 1227 of the finder switch. The relay 1118 also, at its uppermost contacts, supplies positive potential to the seize conductor 1101 and through the winding of relay 1204 to negative potential.

Finder switch operation

The relay 1204, upon operating, completes the circuit of relay 1205 by way of the upper-break contacts of slow-to-release relays 1220 and 1209, respectively. The relay 1205, after an interval, closes its contacts and completes the circuit of slow-to-pull-up relay 1206. The relays 1205 and 1206 afford a delay period of from one-tenth second to three seconds, depending upon their adjustment. The necessity for this delay will become apparent when the lockout feature is gone into. The relay 1206, upon operating, completes a circuit for the relay 1210, from positive potential supplied through the contacts of relay 1206, through the lower-break springs of relay 1209, conductor 1244, through the lower-break springs of relay 1319, conductor 1243, and through the winding of relay 1210 to negative potential. The relay 1210, upon operating, at its break contacts opens the No. 1 line, at its inner-lower make contacts closes a point in its own locking circuit, at its upper-make contacts it prepares an operating circuit for slow-to-pull-up relay 1217 and the locking circuit of relay 1216, at its lowermost make contacts prepares the pulsing circuit, and at its middle-lower make contacts completes the circuit of slow-release relay 1213. The slow-release relay 1213 and its associated relays 1214 and 1215 become energized, but without effect at this time.

The opening of the No. 1 line causes the "from-the-field" line relay 1207 to become deenergized. This relay, at its break contacts, now completes the circuit of the slow-release relay 1208 and it, in turn, the circuit of slow-release relay 1209. The relay 1209, upon operating; at its lowermost contacts completes a locking circuit for the relay 1210, which includes the break contacts of relays 1220 and 1212, respectively, which circuit is independent of the relay 1206; at its upper contacts opens the previously traced circuit of relay 1205, thereby permitting this relay and its associated relay 1206 to restore; and at its upper-make contacts completes the operating circuit of slow-to-pull-up relay 1217. The relay 1217, upon operating, extends its operating circuit to the slow-to-pull-up relay 1218'. This latter relay, upon operating, at its upper contacts closes a point in the operating circuit of relay 1216, and at its lowermost make contacts supplies the negative potential from the No. 2 line, through the lower-make contacts of relay 1210, resistance 1230, through the "from-the-field" line relay 1207 and switch S2 to the No. 1 line, thereby causing the reenergization of the line relay 1207. The relay 1207, upon operating, now completes the circuit of relay 1216 by way of upper-make contacts of relays 1208 and 1218'. The relay 1216, upon operating interrupts the circuit of slow-to-pull-up relay 1217 and completes a locking circuit for itself by way of the upper-make contacts of relay 1210 and the upper-make contacts of relay 1209 to positive potential. The slow-to-pull-up relays 1217 and 1218' immediately restore their armatures. The relay 1218', accordingly, again opens the circuit of the "from-the-field" line relay 1207.

The relays 1211 and 1212 provide a time delay feature operative from the relay 1218', but in the normal operation they do not have time to function before the relay has re-opened the circuit of relay 1211.

The foregoing operation of relays 1217, 1218', and 1216 has thus resulted in a single pulse, of practically two-tenths second duration, being delivered to the line relay 1207, and to all of the other line relays between this point and the dispatcher's station. This is termed the preliminary pulse.

It may be mentioned that the resistance 1230 is introduced to take the place of the "from-the-field" line relays beyond this station, thereby maintaining the normal milliampere flow in the No. 1 line.

The relay 1216, upon energizing, as before explained, forestalls the operation of relay 1212 by releasing the relays 1217 and 1218', the operation of relay 1216 having taken place within the the delay time of relays 1211 and 1212. The operation of the relay 1216 signifies that this field station has seized the line and, accordingly, positive potential is now supplied through the upper-make contacts of this relay to the finder-start lead 1102, through the lower-make contacts of tell-tale relay 1118, pick-up conductor 1103, the last bank contact of bank 1227, the associated wiper to the winding of relay 1218 and negative potential, and also by way of the interrupter contacts of the motor magnet 1225 and the winding of this magnet to negative potential. The closure of this circuit through the motor magnet 1225 causes it to operate in a buzzer-like manner to advance its wipers, which operation will continue as long as the wiper of bank 1227 encounters bank contacts to which positive potential has been applied by way of the lower-break springs of the various tell-tale relays and the finder-start conductor 1102. The branch circuit traced through the relay 1218 effectively holds this relay energized during the operation of the finder. This relay at its lower-break contacts opens the circuit of the slow-to-pull sender relay 1304, which was otherwise closed through the lower-make contacts of relay 1216 and the middle-lower make contacts of relay 1210; and at its upper contacts removes positive potential from the wiper associated with bank 1229 to prevent the improper operation of marking relays while the wiper is passing over its associated bank contacts.

The rotation of the wipers of the finder switch will cease in this instance when they reach their second bank contacts, inasmuch as positive potential has been removed from the second bank contact of the bank 1227, as a result of the operation of tell-tale relay 1118. The relay 1218 now becomes deenergized; at its upper contacts places positive potential by way of the wiper and bank 1229, conductor 1261 to the winding of marker relay 1382 and negative potential; at its inner-upper break contacts again closes a point in the re-set circuit, and at its lowermost break contacts permanently closes the circuit of the relay 1304 of the sender switch. The marker relay 1382, upon operating, extends positive potential by way of the cross-connecting frame 1300 to the second contact of the first-digit bank 1351, to the third bank contact of the second-digit bank 1352, and to the fourth contact of the third-digit bank 1353, respectively.

*Field sender switch operation*

The function of delay relays 1304 and 1305, is to allow a suitable interval, after the release of the "from-the-field" line relays, for the completion of all "lockout" functions, and for the preparation of the dispatcher's incoming circuit. The relay 1305 upon operating, completes the circuit of relay 1306. The relay 1306, upon operating, at its lowermost contacts prepares the locking circuit of relays 1315 to 1319, inclusive, at its uppermost contacts closes a point in the sender restoring circuit, and at its inner-upper contacts applies positive potential through the upper-break contacts of relay 1322 and the break contacts of relay 1301 to the relay 1302 to negative potential. The relay 1302, upon operating, at its lower contacts completes the circuit of relay 1303, and at its upper contacts completes a locking circuit for itself including the break contacts of relay 1301. The relay 1303, upon operating, at its inner-lower make contacts completes the circuit of relay 1301, which, in turn, opens the circuit of relay 1302. The relays 1301, 1302, and 1303, accordingly interact so long as positive potential is supplied to 1302 through the middle-upper contacts of the cut-off relay 1322.

Each time the relay 1303 energizes, in addition to closing the circuit of relay 1301; at its lowermost contacts it transmits pulses from the No. 2 line, supplied with positive potential at the dispatcher's station over conductor 1246, to the lower-make contacts of relay 1303, conductor 1348, the lower-break contacts of cut-off relay 1322, conductor 1247, the lowermost make contacts of relay 1210, compensating resistance 1230, through the "from-the-field" line relay 1207 and the switch contacts of switch S3 over the No. 1 line circuit to negative potential. These pulses, accordingly, operate the line relay 1207 and the corresponding "from-the-field" line relays at field stations intermediate to the sending station and the dispatcher. The "from-the-field" line relays, such as 1207, through the medium of their resting contacts, maintain their associated slow-release relays, such as 1208 and 1209, energized during the pulsing operation.

The relay 1303 also, at its upper contacts, transmits pulses direct to the motor magnet 1331 of the sender switch SS2, causing the same to take one step for each pulse delivered into the No. 1 line.

At the first rotary step of the sender switch, its off-normal contacts ON6 close, thereby completing the circuit of slow-release relay 1311. This is followed in close sequence by the energization of the associated slow-release relays 1312 and 1313. The relay 1311 at its upper-make contacts prepares a circuit for counting relay 1315. The relay 1313 at its contacts prepares a locking circuit for the cutoff relay 1322.

When the marked contact is reached by the wiper of the first-digit bank 1351, positive potential is picked up from contacts on the marker relay 1382 to the second bank contact of the bank 1351, through its associated wiper, through conductor 1361, the upper-break contacts of counting relay 1315, and the winding of the cut-off relay 1322 to negative potential. The cut-off relay 1322, accordingly, becomes energized, at its inner-upper contacts completes a locking circuit for itself including the contacts of relay 1313; at its lower-break contacts opens a point in the traced pulsing circuit, thereby preventing the transmission of further pulses over the No. 1 line; at its upper-break contacts interrupts the circuit extending to the relay 1302 of the pulsing group, and at its uppermost contacts applies positive potential through the off-normal spring contacts ON6 to the motor magnet 1331 and negative potential by way of its interrupter contacts. The motor magnet will, therefore, act as a buzzer and advance its wipers at high speed to their normal positions, at which point the action will cease on account of the off-normal springs ON6 opening the operating circuit.

As a further result of the opening of the off-normal springs the slow-release relay 1311 becomes deenergized. In the interval between the time that the wiper of the bank 1350 reaches its normal contact and the contacts of relay 1311 restore, a circuit is closed from positive potential on the wiper associated with the bank 1350 over the conductor 1360, through the upper-make contacts of relay 1311, the break contacts of relay 1316 and the winding of counting relay 1315 to negative potential. The relay 1315, accordingly, becomes energized and at its upper contacts transfers the operating circuit of the cut-off relay 1322 from connection with the conductor 1361 into connection with the conductor 1362 and the wiper of the second-digit bank 1352 by way of the break contacts of counting relay 1317, and at its inner contacts prepares a locking circuit for itself and an energizing circuit for the relay 1316. The latter circuit becomes effective upon the removal of positive potential from their upper terminals consequent to the deenergization of the slow-release relay 1311 an instant later. The relay 1316, upon operating, transfers the counting circuit from in connection with the upper terminal of counting relay 1315 into connection with the counting relay 1317 by way of the break contacts of the counting relay 1318.

Returning to a consideration of the action of the off-normal springs ON6, it will be remembered that relay 1311 deenergizes shortly after the sender returns to normal, thereby opening the circuit of its associated slow-to-release relay 1312, which, in turn, opens the circuit of slow-release relay 1313. The relay 1313, upon deenergizing, opens the locking circuit of the cut-off relay 1322 which thereupon again becomes deenergized to enable the transmission of the second digit of the code. The slow-to-release feature of relays 1311 and 1312 provide the necessary interval between the sending of the various digits of the code.

The sender will now function to send the second digit of the code, and when the marked contact is reached by the wiper of the second-digit bank 1352 positive potential is extended by way of the conductor 1362, the upper-break contacts of counting relay 1317, the upper-make contacts of counting relay 1315, and the winding of the cut-off relay 1322 to negative potential. The cut-off relay 1322 will, accordingly, operate as before to prevent the transmission of further pulses out over the No. 1 line.

Also, consequent to the energization of cut-off relay 1322, the sender switch is again returned to its normal position. When this occurs, as previously explained, the counting pulse which is transmitted from the transfer bank 1350 extends over the previously traced circuit to the winding of counting relay 1317. This relay, accordingly, becomes energized followed by the energization of its associated relay 1318 upon the restoration of slow-release relay 1311. The relay 1317, upon operating, transfers the cut-off circuit of the cut-off relay 1322 from connection with the conductor 1362 into connection with the conductor 1363 extending to the wiper of the third-digit bank 1353.

The relay 1318, upon energizing, at its lower contacts prepares an operating circuit for the relay 1307 and at its upper contacts transfers the counting circuit from connection with the relay 1317 into connection with the relay 1319.

Upon the deenergization of slow-release relay 1313 the sender switch will again operate, this time to send the third digit of the code. As soon as the off-normal springs ON6 become operated, the slow-release relay 1311 will again become energized and will be followed by the energization of relay 1312. The relay 1312, upon operating, in addition to completing the circuit of its associated slow-release relay 1313, completes the circuit of the relay 1307 by way of the lower-make contacts of relay 1318 and the winding of relay 1307 to negative potential. Consequent to the operation of relay 1312 the associated slow-release relay 1313 also operates to again prepare the locking circuit of the cut-off relay 1322. The relay 1307, upon operating, at its contacts completes a locking circuit for itself and completes the secondary locking circuit of the cut-off relay 1322, by extending its own locking circuit from the lower contacts of the relay 1306 to the relay 1312, thus making the relays 1307 and 1313, as well as the cut-off relay 1322, independent of relay 1311.

Since at this time the relay 1322 is associated with the wiper of the third-digit bank 1353, when the fourth bank contact, which in this instance is the one which is marked, is reached, the cut-off relay 1322 will operate as before to cut-off and prevent the transmission of further pulses to the No. 1 line.

The code is now complete, and the sender must not again function following the deenergization of relay 1313. For this reason, this relay has been locked up through the contacts of relay 1306, as previously described.

Following the transmission of the third digit, and the restoration of the sender, and just prior to the deenergization of slow-release relay 1311, the counting relay 1319 is energized from positive potential supplied through the wiper and normal contacts of transfer bank 1350, over the previously traced counting circuit. The relay 1319, upon operating, at its inner-lower contacts completes a locking circuit for itself including the lowermost contacts of relay 1306. At its uppermost contacts it places positive potential upon the re-set conductor 1241, which extends to the winding of the motor magnet 1225 of the finder switch FS, and at its break contacts opens the circuit of relay 1210.

Many circuit changes occur simultaneously as a result of the closing of the upper contacts and the opening of the lower contacts of the relay 1319. It will first be noted that the application of positive potential to conductor 1241 will cause the motor magnet 1225 to become energized. The finder switch wipers are not advanced, however, at this time because, as previously explained, the switch structure is such that the wipers advance upon the deenergization of the motor magnet. The positive potential applied to conductor 1241 also extends by way of the inner-upper break contacts of relay 1218, the wiper and second-bank contact of re-set bank 1228, conductor 1105, through the lower winding of relay 1119 to negative potential. This relay, accordingly, becomes energized and at its upper contacts interrupts the initial energizing circuit of relay 1118 and completes a locking circuit for itself which includes its upper winding and the lower contacts of the relay 1109, and at its inner contacts interrupts the locking circuit of the relay 1118. This latter relay, upon restoring, at its lower contacts removes the finder-start common conductor 1102, having positive potential thereon, from connection with the kick-off conductor 1103 and re-connects it with the conductor 1104, extending to the second bank contact of the finder bank 1227, through the associated wiper to the conductor 1262 and the winding of relay 1218 to negative potential. The application of positive potential to conductor 1262 will not affect the motor magnet 1225 at this time owing to the presence of positive potential on conductor 1241. The relay 1218, however, becomes energized and at its upper contacts removes positive potential from the traced circuit to the marker relay 1382 and this relay, accordingly, becomes deenergized. The relay 1218 also at its lowermost-break contacts opens the circuit of start relay 1304 of the sender, but, as will be shown later, this circuit has already been opened consequent to the deenergization of relay 1218. The relay 1118 also, at its uppermost contacts removes positive potential from the seize-common conductor 1101, thereby causing the deenergization of the relay 1204 of the finder switch. It should be remembered that the relays 1205 and 1206 are at this time deenergized on account of their circuits having been opened by the break contacts of relay 1209 at the beginning of the transmission of the code or when the line was seized.

Returning to a consideration of the relay 1319 of the sender, the operations which occur consequent to the opening of its lower contacts will be gone into which, as previously explained, effects the deenergization of the finder relay 1219. This relay, upon restoring, at its middle-lower make contacts interrupts the circuit of relay 1304 of the sender, whereupon all of the sender relays, which have been previously operated and locked up, are restored to normal. The relay 1219 at its upper contacts interrupts the circuit of relay 1216, at its inner-lower contacts it interrupts a second point in its own locking circuit, at its lowermost-break springs re-closes the No. 1 line at this point, but without effect at this time, as the line is still open at the contacts of relay 1215, and at its middle-lower contacts interrupts the circuit of slow-release relay 1213. The relay 1213, upon deenergizing, opens the circuit of slow-release relay 1214 which deenergizes and in turn opens the circuit of the slow-release relay 1215. This latter relay upon restoring finally re-closes the No. 1 line, whereupon the line relay 1207 again becomes energized and is followed in the usual manner by the deenergization of its slow-release relays 1208 and 1209 in the order named. The finder has thus released the line, which may now be seized by the operation of a second piece of equipment in the same field station or by the operation of a piece of equipment in some other field station.

The slow-release relays 1214 and 1215 afford the necessary delay required between the sending of codes, for the release of the dispatcher's incoming switches.

The deenergization of relay 1319 of the sender brings about the removal of positive potential from the conductor 1241 extending direct to the winding of the motor magnet 1225 of the sender. This permits the positive potential now present on the conductor 1104 and on other conductors terminating in this bank to cause the finder to operate in a buzzer-like-manner to drive all of its wipers to their normal positions, the relay 1218 being energized throughout the buzzer action. It will be noted that positive potential is maintained on the finder-start common conductor 1102 by the off-normal bank 1226 and its associated wiper. The timing is such that the finder will restore to normal before the relay 1215 deenergizes to re-close the No. 1 line.

Second field tell-tale relay operation

If, previous to the operation just described, a second tell-tale relay of the group TTR has become operated, the wiper of bank 1227 will find the marked contact of such tell-tale relay during the course of the "return-to-normal" function, and the finder will stop on that contact. When this occurs the relay 1218 will, of course, also cease to receive positive potential and will, accordingly, deenergize and through the medium of the upper-break contacts completes the operating circuit of the marker relay corresponding to the tell-tale relay operated. Because of the operation of a second tell-tale relay, the positive potential will be maintained on the seize conductor 1101, thus maintaining the relay 1204 in its operated position. Therefore, immediately following the deenergization of relay 1209, relay 1205 will again energize in an attempt to cause the finder to again seize the line.

To-the-field operation

This operation involves the circuits shown in Fig. 4, which are those also employed in the first described form of system. It will, therefore, be unnecessary to again describe the "to-the-field" operation at this time.

Dispatcher locks out the field

Then the dispatcher is using the line, the field stations are prevented from using it because they are locked out by the relay 1220, which becomes energized from positive potential supplied to it through the contacts of the slow-release relay 409 of the connector. The relay 1220 locks out the field station by, at its upper contacts, opening the energizing circuit of the associated relay 1205, and by opening the locking circuit of the relay 1210.

Field locks out field

If any intermediate station seizes the line all other field stations are locked out, but there is a difference, depending upon whether the "trying station" is between the station which has seized the line and the dispatcher or whether it is beyond the station which has seized the line.

"Trying station" between

In accordance with the foregoing assumption the relays 1208 and 1209 of the station which has seized the line and of the between stations are energized. Therefore, an "in between station" is locked out because there can be no circuit established for its relay 1205, because of the break contacts on the associated relay 1209.

"Trying station" beyond

In accordance with the foregoing assumption the relay 1210 of the station which has seized the line has opened the No. 1 line. Therefore, the line relays 1207 in all of the "beyond stations" are deenergized, while the relays 1208 and 1209 are energized. A "beyond station" is therefore locked out because there can be no circuit established for its relay 1205, because of the break springs on the relay 1209 being opened. Also, the No. 1 line is opened to all stations beyond the one which has seized the line until the line is released on the completion of the signal, and this alone is sufficient to lock out the beyond station.

Simultaneous field operation

Two field stations may function so that the relays 1220 of the two finder switches become energized simultaneously. The station nearest the dispatcher will function normally and seize the line. The "beyond" station will lock out as follows:

The relay 1207 will deenergize, because of the line being opened at the nearest station to the dispatcher's station, and its associated slow-release relays 1208 and 1209 will, accordingly, become energized. The relay 1209, upon operating, will complete the formerly traced circuit for relays 1217 and 1218'. Accordingly, the relay 1218' will attempt to send the "preliminary pulse" through the "from-the-field" line relay 1207, but cannot do so because the No. 1 line has already been opened at the "near station", therefore, the relay 1216 will not be energized as is the case when a preliminary pulse is transmitted. For this reason the relay 1218' will remain energized through the back contacts of the relay 1216, thus not breaking the circuit of relay 1211. In due time the slow-to-operate relay 1212 will energize and open the locking circuit of relay 1210. The relay 1210 will, accordingly, deenergize, again opening the circuit of relays 1217 and 1218', thus locking out this station. The relays 1211 and 1212 will release in turn upon the deenergization of relay 1218, and all relays of this station will be once more in their normal position, with the exception of the tell-tale relay or relays which have been operated and the relay 1204 of the finder.

When the line is again free, the energization of the line relay 1207 and the consequent restoration of the relay 1208 of the finder will again cause the relay 1205 to "try" the line. If it is successful in causing the energization of the relay 1216 it has succeeded in seizing the line, and all other stations are locked out until the completion of the signal.

Circuit operations at the dispatcher's station

Figure 5:
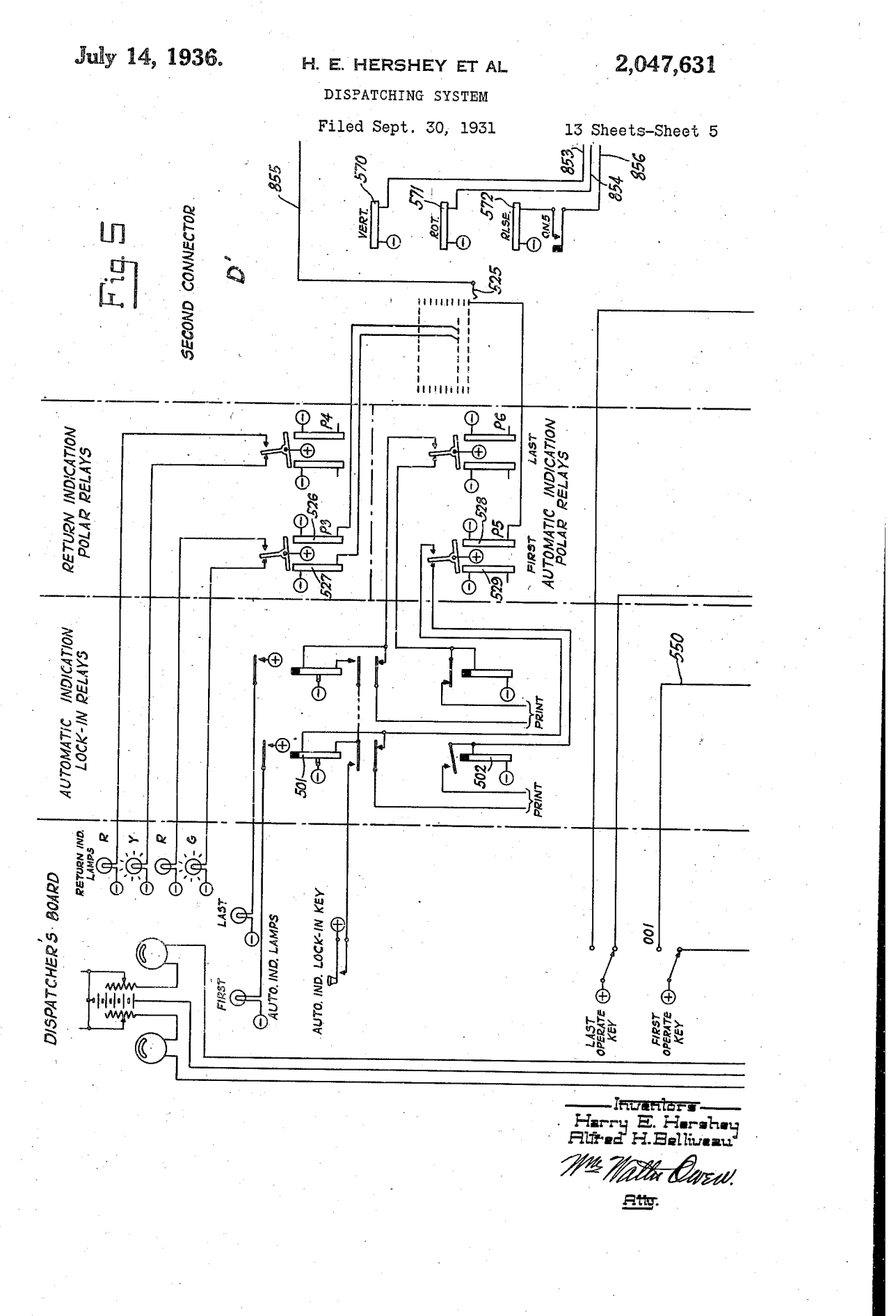

As previously stated the foregoing part of the alternative form of system comprises the apparatus shown in Figs. 5 and 8 which are employed in either type of system, together with Figs. 9 and 10 which are specific to the alternative system being described or now under consideration. Certain of the equipment of Figs. 5 and 8 is in operated positions for reasons already explained in describing the dispatcher's equipment of the first form of the dispatching system.

In order to explain the operation of the circuits and apparatus of the system shown in Figs. 9 and 10 it will be assumed that the dispatcher moves the "first" operate key into engagement with its upper contacts.

Dispatcher's station tell-tale relay operation

As a result of the foregoing operation the relay 921 of the tell-tale relays TTR' becomes deenergized, but without effect at this time. The application of positive potential to the conductor 550 by the operation of the operate key causes the operation of tell-tale relay 918 over the circuit including the upper-break contacts of relay 919 and the inner-upper break contacts of relay 916. The relay 918, upon operating, at its upper contacts places positive potential on the seized-common conductor 901 and through the relay 904 to negative potential, at its inner-upper contacts completes a locking circuit for itself through the inner-upper contacts of relay 919, at its lowermost contacts disconnects the conductor 904', extending to the second bank contact of the finder switch FS1, from the start conductor 902, thus assuring that the finder will search and seize a tell-tale relay of the first group, and connects the finder-start common conductor 902 through its lower-make contacts to the kick-off conductor 903 extending to the normal contact of bank 927, but without effect at this time.

Operation of finder switch FS1

Inasmuch as there may be a large number of "to-the-field" operations originating at the dispatcher's board, and since a finder switch of the particular type employed can only serve twenty-four such operations, it follows that a plurality of finder switches which work in conjunction with a single sender must be employed. This requires a lockout circuit, such that any finder may seize the sender and lock out the remaining finders while the sender is in use.

The relay 904 becomes energized as a result of positive potential being applied to the seize conductor 901 and closes a circuit from positive potential supplied through the break contacts of sender relay 1020 over the conductor 1078, through the inner-break contacts of sender relay 1032, the break contacts of relay 1031, the test conductor 977, and through the lower break contacts of relay 905 and the contacts of relay 904, through the winding of relay 905 to negative potential. The relay 905, upon energizing, completes a locking circuit for itself including the contacts of relay 904, its make-before-break contacts, the lockout conductor 978, and the winding of relay 1032.

The relay 1032 operates over this circuit, at its inner-break contacts opens the test circuit, thereby removing positive potential from the test conductor, thereby locking out all other finders. It will be noted that the lockout conductor 978 passes through the lower-break contacts of relay 905 which insures a lockout in case of simultaneous finder operation. The finder nearest the sender will be seized, the others will be locked out.

The relay 1232, in addition to opening the test circuit, at its lowermost-contacts interrupts the No. 3 line which extends through the break contacts of relay 1023, the conductor 1079, the lower contacts of relay 1032, and conductor 1081 to the No. 3 line "out". Since the No. 3 line is the "to-the-field" line conductor, the connector relay 400 at each field station will deenergize. When this occurs its associated slow-release relay 409 applies positive potential to the conductor 1242 extending to the relay 1220 of the finder switch at the field station and this relay will, accordingly, energize to lock out that station on the "from-the-field" side.

Returning now to a consideration of the relay 905 of the finder switch FS1, which when energized, applies positive potential to the relay 950. The relay 950, upon operating, at its lower contacts prepares a point in the restoring circuit for the motor magnet 925 of the finder and at its upper contacts applies positive potential to the finder-start conductor 902. The positive potential applied to conductor 902 passes through the lower-make contacts of relay 918, to the kick-off conductor 903, then through the normal contact and wiper of bank 927, and through the interrupter contacts of the motor magnet 925 and the winding of this magnet to negative potential. The motor magnet will now operate in order to advance its wipers step-by-step over their respective bank contacts.

When the second contact is reached the rotation will cease, since the tell-tale relay 918 has removed finder-start common from the second bank contact of the bank 927. From relay 918, which is energized in multiple with the motor magnet 925 during the operation of the finder switch, becomes deenergized when the rotation of the finder switch ceases, and at its inner-lower contacts applies positive potential by way of the wiper and marker bank 929' and the conductor 1072 to the marking relay 1082 and this relay, accordingly, energizes to register the code to be transmitted, upon the bank contacts of the sender switch SS4, in the same manner as this operation is performed in the field station. The relay 918, also, at its lowermost contacts closes the sender-start circuit, which extends from positive potential at the middle contacts of relay 905, through the lower contacts of relay 918, the conductor 1077, through the inner-break contacts of relay 1020, through the winding of the start relay 1004 of the sender to negative potential.

*Dispatcher's station sender switch operation*

The relay 1004, upon operating, completes the circuit of slow-to-pull relay 1005 which, in turn, completes the circuit of relay 1006. This latter relay, upon operating, at its upper contacts completes the circuit of the relay 1002 by way of the upper-break contacts of relay 1022, the conductor 1076', and the break contacts of the relay 1001, causing this relay and its associated relays 1001 and 1003 to interact to operate the sender SS4 and transmit pulses over the No. 3 line by intermittently closing its lowermost contacts in the same manner that these operations are performed by similar relays of the sender switches, hereinbefore described. The relay 1006 also, at its inner-lower contacts prepares the "return-to-normal" circuit of the sender, at its middle-lower contacts prepares the locking circuits for the relays 1015 to 1019, inclusive, and at its lowermost contacts prepares a locking circuit for the relays 1007 and 1013, and at its inner-upper contacts completes the circuit of slow-release relay 1021. This latter relay, upon operating causes the operation of slow-release relays 1022 to 1026, inclusive, in sequence.

At the first step of the sender switch SS4 its off-normal springs ON7 close, thereby completing an energizing circuit for the slow-release relay 1011. This relay, in turn, causes the energization of the associated slow-release relays 1012 and 1013, respectively. When the wiper of the first-digit bank 1051 reaches the marked contact it picks up positive potential applied from the operated contacts of the marker relay 1082. This positive potential is extended over conductor 1061, through the break contacts of counting relay 1015, and through the winding of cut-off relay 1022 to negative potential. The relay 1022, accordingly, operates; at its lower-break contacts opens a point in the No. 3 line to prevent the further transmission of pulses thereover, at its upper-break contacts it opens the circuit extending to the relay 1002 of the pulsing relay group, at its inner-upper contacts it completes a locking circuit for itself including the contacts of slow-release relay 1013, and at its inner-lower contacts completes the "return-to-normal" circuit of the sender. This circuit extends from positive potential applied through the off-normal springs ON7, the lower-make contacts of the cut-off relay 1022, the inner-lower make contacts of relay 1006, through the inner-upper contacts of the motor magnet 1031 and the winding of this magnet to negative potential.

The motor magnet 1031 will now act as a buzzer and return the sender switch to its normal position, at this time the off-normal springs ON7 again open the circuit of the motor magnet, and of the associated slow-release relay 1011. The relay 1011, accordingly, restores, which results in the restoration of the slow-release relays 1011, 1012, and 1013. These relays provide the necessary time interval between the digits which is necessary to allow the connector relays 409 and 410, at all field stations, to deenergize.

When the wiper associated with bank 1050 of the sender reaches its normal contact, the energizing circuit of the counting relay 1015 is completed by way of the conductor 1060, the upper-make contacts of relay 1011, and the break contacts of relay 1016. This circuit is opened later when the relay 1011 becomes deenergized, whereupon, the relay 1016 energizes and locks up in series with the relay 1015. The relay 1015, upon operating, in addition to preparing a locking circuit for itself and an operating circuit for the associated relay 1016, at its uppermost contacts disconnects the winding of cut-off relay 1022 from connection with the conductor 1061 and connects it by way of the upper-break contacts of counting relay 1017 to conductor 1062 extending to the wiper of the second-digit bank 1052. The relay 1016, upon operating, transfers the counting circuit from connection with the winding of relay 1015 into connection with the winding of counting relay 1017 by way of the break contacts of relay 1018.

When the cut-off relay 1022 becomes deenergized, consequent to the release of slow-release relay 1013, the sender again begins to function, this time to transmit the second digit of the code as determined by the marked contact in the bank 1052. When the marked contact in this bank is encountered the cut-off relay 1022 is again operated to discontinue the transmission of pulses over the No. 3 line and to bring about the restoration of the sender switch wiper in a manner hereinbefore described.

When the sender switch wipers return to normal, positive potential, supplied from the transfer bank 1050, operates the counting relay 1017. This relay, accordingly, transfers the operating circuit of cut-off relay 1022 from connection with conductor 1062 into connection with conductor 1063 extending to the wiper of the third-digit bank 1053. Subsequently, upon the restoration of the slow-release relay 1011, the relay 1018 becomes energized in series with the relay 1017.

The relay 1018, upon operating, transfers the counting circuit from connection with relay 1017 into connection with the relay 1019 and at its lower contacts prepares an operating circuit for the relay 1007.

When the cut-off relay 1022 becomes deenergized the sender again functions, to transmit the third digit of the code. As soon as the off-normal springs ON7 are closed, the relay 1011 and its associated slow-release relays 1012 and 1013 again become energized. This time the relay 1012, upon operating, in addition to completing the circuit of relay 1013, as in the former instances, also completes the circuit of relay 1007 by way of the lower-make contacts of counting relay 1018. The relay 1007, upon operating, completes a locking circuit for itself including the lower-make contacts of relay 1006 and also serves to hold the slow-release relay 1013 energized independent of the contacts of relay 1012, so that the locking circuit of the cut-off relay 1022 is now dependent upon the relay 1006 instead of being dependent on the holding of relays 1012 and 1013 energized by the relay 1011.

When the sender returns to normal, following the sending of the third and last digit of the code, the counting relay 1019 becomes energized from positive potential supplied from the transfer bank 1050. The relay 1019, upon operating, at its inner contacts completes a locking circuit for itself including the middle-lower contacts of the relay 1006, and at its middle contacts completes the circuit of relay 1020. The relay 1020 at its lower pair of break contacts removes positive potential from the test conductor 1078. At its inner-break contacts opens the start circuit to relay 1004 of the sender, and at its lowermost contacts places a shunt about the lower-break contacts of relay 1032 of the sender, but without effect at this time.

The relay 1019, in addition to causing the operation of relay 1020, at its lowermost contacts supplies positive potential to the conductor 1076, through the make contacts of relay 950 of the finder and the winding of the motor magnet 925 to negative potential. Positive potential is also supplied from the conductor 1076 through the middle break contacts of relay 918, the wiper and second bank contact of the bank 928, the conductor 995', and through the lower winding of relay 919 to negative potential. The relay 919 will, accordingly, become energized and at its upper contacts opens the initial operating circuit of relay 918 and completes a locking circuit for itself including the upper contacts and the associated first operate key, and at its inner-upper contacts opens the locking circuit of relay 918. The relay 918, accordingly, restores, at its lower set of contacts disconnects the finder-start conductor 902 from connection with the kick-off conductor 903 and reconnects it to the conductor 904' extending to the second contact of bank 927 with which its wiper is associated at this time. The relay 918, also at its uppermost contacts, removes positive potential from the seize-common conductor 901, thus causing the deenergization of the associated relay 905. Since the relay 1032 of the sender is maintained energized in series with the relay 905, the relay 1032 also becomes deenergized at this time.

The relay 905, upon restoring, at its middle contacts opens a second point in the circuit of relay 1004 which already has had its circuit opened at the contacts of relay 1020, and at its inner contacts opens the circuit of relay 950.

Upon the deenergization of relay 1004 the associated relays 1005, 1006, 1021, and 1022' to 1026, inclusive, become deenergized in the order named. The delay interval introduced by the slow-release relays 1021, 1022', and 1023 produces the time interval required between the last pulse of the code and the reenergization of the "to-the-field" line relays.

The restoration of relay 1006 also causes the deenergization of the relays 1007, 1013, and 1015 to 1019, inclusive. The relay 1019, upon restoring, opens the locking circuit of the relay 1020, thereby permitting this latter relay to also restore. The relay 1013, upon restoring, opens the locking circuit of the cut-off relay 1022, thereby permitting this relay to also restore. The relay 1019, upon restoring, also at its lowermost contacts removes positive potential from the conductor 1076, thereby permitting the motor magnet 925 of the sender to become deenergized and to thus advance its wipers one step. The motor magnet will now actuate as a buzzer to advance its wipers to normal position, positive potential being supplied to the finder-start common from the wiper of the associated bank 926.

Subsequent to the restoration of the finder switch, the slow-release relay 1026 of the finder will become deenergized, the slow-release relay of the chain having introduced sufficient time interval to insure the restoration of the finder switch prior to the deenergization of relay 1026. The relay 1026 upon restoring opens the circuit of sender relay 1020, which, upon deenergizing, at its lowermost break contacts now replaces positive potential on test conductor 1078. The lockout circuit is now at normal and the sender may be seized by another finder.

The delay of slow-to-release relays 1024, 1025, and 1026 introduces the necessary time interval required between the reenergization of the "to-the-field" line relays and the starting of the second code.

*Additional "field" tell-tale relay operations*

If it so happens that other tell-tale relays of the group associated with the finder FS1 become operated, previous to the completion of a code, the circuits are so arranged that the finder in question will hold the sender SS4 until all codes have been sent.

In the event of a second tell-tale relay operation the relays 904 and 905 of the finder switch and the relay 1032 of the sender switch will not release because of the application of positive potential to the common-seize conductor 901 by the second operated tell-tale relay. Under these circumstances subsequent to the placing of positive potential upon the re-set conductor 1076 upon completion of the first initiated code, the finder switch will advance as before, but instead of restoring to normal, comes to rest upon the finder bank contact associated with the next operated tell-tale relay of the group. At this time the marker relay individual to the second operated tell-tale relay will be energized.

The sender will now function as before, except that negative potential will be supplied from the No. 3 line to the No. 3 line "out" by way of the resting contacts of relay 1023 and the lower-make contacts of relay 1020, rather than through the break contacts of relay 1032. The deenergization of relay 1020 will not free the sender because the test conductor 1078 is opened at the inner contacts of relay 1032. Following the deenergization of relay 1020, after transmission of the first code, the relay 1004 will again become energized, since the relay 905 of the finder is maintaining positive battery on the start conductor 1077. The sender will now function to transmit the code associated with the newly operated telltale relay of the finder.

Operation of the incoming selector IS

Since the circuits shown in Fig. 8, comprising the incoming selector, are those employed in the first described form of the system, and since these circuits operate in the alternative form of system in identically the same manner as in the first form a repetition of this description is believed to be unnecessary.

Dispatcher locks out the field

When the dispatcher seizes the line he opens the circuit of the No. 3 line, and as a result, the field stations are locked out because relay 1220 of the finder switch at each field station has become energized as a result of the energization of the relay 409 of the connector following the interruption of the No. 3 line and the consequent deenergization of the field relay 400. As previously pointed out the relay 1220, upon operating, opens the energizing circuit of the relay 1205, thereby locking out the station and preventing it from seizing the line.

Field locks out dispatcher

When the field seizes the line, the incoming selector relay 800 at the dispatcher's station becomes deenergized, thereby causing the operation of the associated slow-to-release relay 811. This relay, upon operating, places positive potential over conductor 1074 to the relay 1031 of the finder switch FS1. The relay 1031, upon operating, at its contacts interrupts the test conductor and in this manner prevents the dispatcher from seizing the line.

Simultaneous operation

It may occasionally happen that the dispatcher may cause the No. 3 line to be opened at the exact time that the field station brings about the opening of the No. 1 line. In such a case the field station will be locked out for the reason that while the relay 1216 of the field station finder is waiting for the preliminary pulse, the relay 1220 becomes energized, as a result of the opening of the No. 3 line by the dispatcher, thereby opening the circuit of the relay 1210 at the lower contacts of relay 1220 and in this manner preventing the preliminary pulse to materialize. The field station finder relays 1217 and 1218' are made slow-to-operate for just this reason, so that by delaying the preliminary pulse, the dispatcher will have preference in case of simultaneous seizures. Therefore, in no case can both the field and the dispatcher stations seize the line at the same time.

Automatic indication

Since these circuits and apparatus comprise corresponding equipment in the first described system and function identically in the alternative form of system, no further description of this part of the alternative form of system need be described.

Two station system

In a very small installation only one field station may be required. Under such circumstances the field station need not be arranged to transmit a "preliminary" lockout pulse, as required in the former system. Also with only one field station the number of "to-the-field" functions can easily be selected by a two-digit code.

Certain of the apparatus and circuits, hereinbefore described, may be readily modified to produce a simple system, such as outlined.

As an example of such a system reference is made to the equipment shown in Figs. 9, 10, and 4, which may be readily modified to serve as the control, selecting, and operating equipment of either the dispatcher's station or the field station.

The group of tell-tale relays TTR' and the finder FS1 and its associated finders may be employed in either station without change. However, since the transmission of a two-digit code is to be employed, the marking of the codes to be transmitted can be more economically accomplished by providing the finder switches, such as FS1, with a second marker bank. The two marker banks may then directly apply ground to the sender banks via the cross-connecting frame 1000, thereby eliminating the use of marker relays.

Since two-digit codes are all that are required, in the sender SS4, the second-digit bank 1052 and the associated counting relays 1015 and 1016 can be omitted, the second digit of the code then being under control of the third-digit bank 1053.

Likewise, in the connector C, Fig. 4, since only two digits will be received by its line relay 400, the minor switch M and the counting relays 403 and 404 can also be omitted and the conductor extending from the lower terminal of relay 401 tied to the lower armature of relay 406. With these changes the transmission of the two digits, comprising the code, will cause the connector to select and operate the apparatus terminating in the selected bank contact. Obviously when the connector is used at the dispatcher's station its line relay 400 is included in the No. 1 line, whereas when the same is employed at the field station its line relay is included in the No. 3 line.

The sender switch SS4 as used in the large system, hereinbefore described, is always employed in the dispatcher's station. For this reason it shows the circuits arranged to transmit pulses over the No. 3 line. However, it should be understood that in the two station system when this sender is used in the field station the conductors labeled No. 1 line, No. 2 line, and No. 3 line are tied together instead of extending to the terminals of a line battery as they do at the dispatcher's station; and that the No. 1 and No. 3 lines "out" extend to the dispatcher's station as the No. 3 and No. 1 lines "in", respectively.

The system may be further simplified by omitting the lockout relay 1031 of both stations, thereby permitting the simultaneous transmission of codes in both directions.

From the foregoing it will be appreciated that applicants have devised dispatching apparatus and circuits which meet a wide choice of requirements in the dispatching system field.

What is claimed is:

1. In a signalling system, devices each having a plurality of positions, relay groups individual to each device, which groups are further divided into sub-groups individual to the different positions of a device, one relay of a sub-group operated by the device dependent on the position thereof, a code sending switch, a finder switch common to said groups, means operated consequent to the operation of said one of the relays of a sub-group to operate said finder switch to find the sub-group and to prepare said sender switch for operation to transmit a code characteristic solely of such sub-group, a locking circuit for the operated relay including break contacts of another relay of such sub-group preventing its restoration occurring until the other relay of such group becomes energized, and means controlled by said sender only upon the completion of transmission of the initiated code for energizing the other relay of said sub-group.

2. In a signalling system wherein a sender switch is arranged to transmit codes of impulses out over a line consequent to the operation of one of a plurality of devices and wherein each code transmitted is characteristic only of the device initiating the transmission and of the new position of such device; the provision of means for controlling the code to be registered upon the sender comprising a marker relay for each code each having means for differently marking said sender, a pair of relays individual to each position of each of the devices, a circuit for a relay of any one of said pairs closed by operation of its device, a locking circuit for such relay including break contacts of the other relay of the pair, a finder switch, means controlled by the operation of said first relay of a pair to operate said finder switch to find such relay and to select and close the circuit of the marker relay individual thereto, means controlled by the finder switch for then operating said sender to transmit the selected code, and means for thereafter actuating the other relay of said sub-group and restoring said finder switch to normal.

3. In a signalling system, multiple position devices, a finder switch, means controlled by a change in position of one of said devices for operating said finder to find a position corresponding to the new position of the device, a code sending switch, means controlled by the finder switch for marking the sending switch in accordance with the position found, means controlled by the sender switch for transmitting a code of impulses in accordance with the marking, and means controlled by the sending switch for restoring the finder to normal position when the complete code is transmitted.

4. In a signalling system, devices movable to two alternate positions, a relay group for each device, including a relay for each position of the device and auxiliary relays, means for operating one relay of a group consequent to its device moving to a new position, a code sending switch common to said devices and having banks of contacts, equipment common to said relay groups controlled by the operation of a relay of any group to initiate the operation of said code sending switch, means whereby the actuated relay effects the placing of marking potential on a combination of bank contacts of said sending switch individual to the actuated relay to prepare the switch for the transmission of a code characteristic of the new position of the device associated with such relay; a locking circuit for such operated relay, preventing its restoration should the device again immediately change its position before said sender has operated; means controlled by said sender, upon completion of the transmission of the initiated code, to effect the energization of an auxiliary relay of the group to which the first operated relay belongs and for deenergizing the first energized relay of such group, a locking circuit for such auxiliary relay held closed by said device so long as it remains in its last operated position and means controlled by said auxiliary relay for preventing further operation of said last mentioned relay.

HARRY E. HERSHEY.
ALFRED H. BELLIVEAU.